US012447479B2

(12) United States Patent
Sekino et al.

(10) Patent No.: US 12,447,479 B2
(45) Date of Patent: Oct. 21, 2025

(54) LIQUID SPRAY DEVICE

(71) Applicant: SEIKO EPSON CORPORATION, Tokyo (JP)

(72) Inventors: Hirokazu Sekino, Chino (JP); Yasunori Onishi, Shiojiri (JP); Takahiro Matsuzaki, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 418 days.

(21) Appl. No.: 17/891,423

(22) Filed: Aug. 19, 2022

(65) Prior Publication Data

US 2023/0073787 A1 Mar. 9, 2023

(30) Foreign Application Priority Data

Aug. 20, 2021 (JP) ................................ 2021-135124

(51) Int. Cl.
*B05B 1/08* (2006.01)
*B08B 3/02* (2006.01)

(52) U.S. Cl.
CPC . *B05B 1/08* (2013.01); *B08B 3/02* (2013.01)

(58) Field of Classification Search
CPC ........... B05B 1/08; B05B 12/082; B05B 1/02; B05B 12/085; B05B 1/083; B08B 3/02; B05C 5/0291; B05C 11/1034; B05C 11/1002
USPC .............................................................. 239/8
See application file for complete search history.

(56) References Cited

U.S. PATENT DOCUMENTS

2010/0243753 A1* 9/2010 Doak .................... B05B 7/0475 239/398
2017/0332467 A1* 11/2017 Sanders ................. H05G 2/006

FOREIGN PATENT DOCUMENTS

| | | | |
|---|---|---|---|
| CN | 204870075 | U | 12/2015 |
| JP | S61-103443 | A | 5/1986 |
| JP | 2001-241887 | A | 9/2001 |
| JP | 2008-284523 | A | 11/2008 |
| JP | 2018-192229 | A | 12/2018 |
| JP | 2019-081130 | A | 5/2019 |
| JP | 2020-094317 | A | 6/2020 |

* cited by examiner

*Primary Examiner* — Arthur O. Hall
*Assistant Examiner* — Juan C Barrera
(74) *Attorney, Agent, or Firm* — Harness, Dickey & Pierce, P.L.C.

(57) ABSTRACT

A liquid spray device includes a spray nozzle having at least one nozzle hole configured to spray a liquid, a pressurized liquid supply unit configured to pressurize a liquid and feed the pressurized liquid to the spray nozzle, and a controller configured to control an operation of the pressurized liquid supply unit such that the liquid to be sprayed from the nozzle hole flies in a state of splitting into droplets from a continuous flow. The nozzle hole has a hole diameter of 0.015 mm to 0.030 mm. The liquid has a viscosity of 0.6 mPa·s to 4.0 mPa·s. The controller controls a supply pressure of the pressurized liquid supply unit such that a velocity of the liquid to be sprayed from the nozzle hole is 10 m/s to 80 m/s, and that the number of droplets (droplets/s), which is the number of the droplets generated by the continuous flow splitting into the droplets per second, is in a range of $0.8\times10^5$ to $9.0\times10^5$.

8 Claims, 21 Drawing Sheets

LIQUID SPRAY DEVICE

The present application is based on, and claims priority from JP Application Serial Number 2021-135124, filed Aug. 20, 2021, the disclosure of which is hereby incorporated by reference herein in its entirety.

BACKGROUND

1. Technical Field

The present disclosure relates to a liquid spray device suitable for performing a treatment such as cleaning by spraying a liquid toward a face or other skin or an object such as a fiber or a metal.

2. RELATED ART

As an example of this type of liquid spray device, there is a skin cleaning device described in JP-A-61-103443. JP-A-61-103443 discloses a skin cleaning device in which a cup provided with an opening facing outward is provided at a distal end portion of a hand-held portion, and a spray unit, which sprays water pressure-fed from a discharge port of a pump toward the opening through the inside of the cup in the form of mist, is used by being applied to the skin.

However, the skin cleaning device of JP-A 103443 has a problem in that sufficient pressing force cannot be obtained because sprayed water is atomized and then applied to the skin, and it is difficult to clean the skin, particularly, to effectively clean sebum from sebaceous glands and dirt.

JP-A-61-103443 does not describe a treatment such as cleaning by spraying a liquid toward an object such as a fiber or a metal.

SUMMARY

A liquid spray device according to an aspect of the present disclosure is provided to solve the above problem. The liquid spray device includes a spray nozzle having at least one nozzle hole configured to spray a liquid, a pressurized liquid supply unit configured to pressurize a liquid and feed the pressurized liquid to the spray nozzle, and a controller configured to control an operation of the pressurized liquid supply unit such that the liquid to be sprayed from the nozzle hole flies in a state of splitting into droplets from a continuous flow. The nozzle hole has a hole diameter of 0.015 mm to 0.030 mm. The liquid has a viscosity of 0.6 mPa·s to 4.0 mPa·s. The controller controls a supply pressure of the pressurized liquid supply unit such that a velocity of the liquid to be sprayed from the nozzle hole is 10 m/s to 80 m/s, and that the number of droplets (droplets/s), which is the number of the droplets generated by the continuous flow splitting into the droplets per second, is in a range of $0.8\times10^5$ to $9.0\times10^5$.

In addition, a liquid spray device according to an aspect of the present disclosure is provided to solve the above problem. The liquid spray device includes a spray nozzle having at least one nozzle hole configured to spray a liquid, a pressurized liquid supply unit configured to pressurize a liquid and feed the pressurized liquid to the spray nozzle, and a controller configured to control an operation of the pressurized liquid supply unit such that the liquid to be sprayed from the nozzle hole flies in a state of splitting into droplets from a continuous flow. The nozzle hole has a hole diameter of 0.05 mm to 0.12 mm. The liquid has a viscosity of 0.6 mPa·s to 4.0 mPa·s. The controller controls a supply pressure of the pressurized liquid supply unit such that a velocity of the liquid to be sprayed from the nozzle hole is 10 m/s to 70 m/s, and that the number of droplets (droplets/s), which is the number of the droplets generated by the continuous flow splitting into the droplets per second, is in a range of $0.3\times10^5$ to $4.0\times10^5$.

DESCRIPTION OF EXEMPLARY EMBODIMENTS

Figure 1:
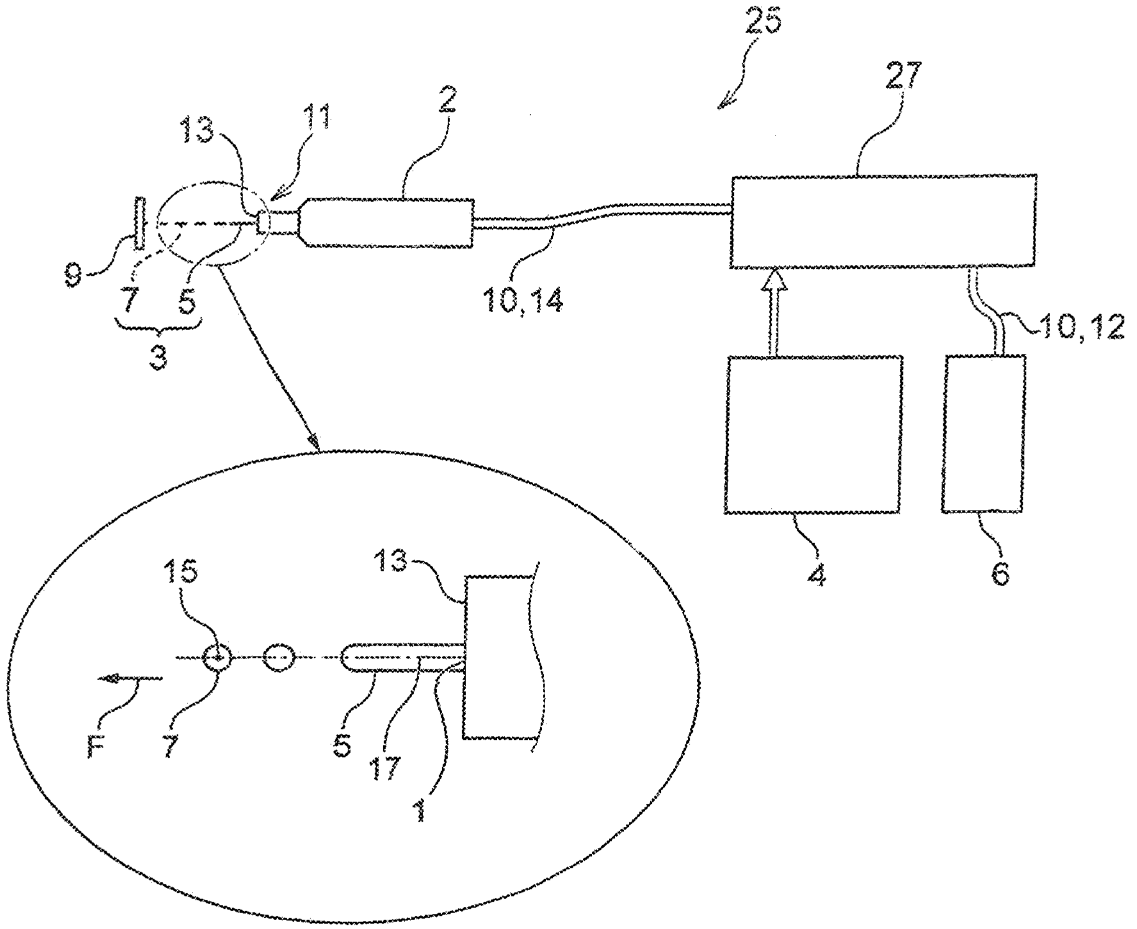
FIG. 1 is an overall schematic configuration diagram of a liquid spray device according to a first embodiment of the present disclosure.

Hereinafter, the present disclosure will be schematically described first.

To solve the above problem, a first aspect of the present disclosure provides a liquid spray device. The liquid spray device includes a spray nozzle having at least one nozzle hole configured to spray a liquid, a pressurized liquid supply unit configured to pressurize a liquid and feed the pressurized liquid to the spray nozzle, and a controller configured to control an operation of the pressurized liquid supply unit such that the liquid to be sprayed from the nozzle hole flies in a state of splitting into droplets from a continuous flow. The nozzle hole has a hole diameter of 0.015 mm to 0.030 mm. The liquid has a viscosity of 0.6 mPa·s to 4.0 mPa·s. The controller controls a supply pressure of the pressurized liquid supply unit such that a velocity of the liquid to be sprayed from the nozzle hole is 10 m/s to 80 m/s, and that the number of droplets (droplets/s), which is the number of the droplets generated by the continuous flow splitting into the droplets per second, is in a range of $0.8\times10^5$ to $9.0\times10^5$.

Hereinafter, the number of droplets (droplets/s), which is the number of the droplets generated by the continuous flow splitting into the droplets per second, may be referred to as a "droplet frequency".

In the liquid spray device according to the present disclosure, since the controller controls the supply pressure of the pressurized liquid supply unit, a liquid is sprayed as a continuous flow from the nozzle hole of the spray nozzle, and then the continuous flow splits to generate droplets while flying.

It is known that a size of the droplets generated in this manner has a relation with a hole diameter b of the nozzle hole based on a non-viscous linear theory. That is, it is known that the size of the droplets is about 1.88 times the hole diameter b of the nozzle hole based on a non-viscous linear theory regardless of the magnitude of the supply pressure.

When the hole diameter of the nozzle hole is set to 0.015 mm to 0.030 mm, the size is calculated to be 0.0282 mm to 0.0564 mm. Further, in consideration of a slight variation due to the smoothness of the nozzle hole, environmental conditions, and the like, the size of the droplets is about 0.03 mm to 0.1 mm in terms of an average droplet diameter.

Next, a spray velocity of the liquid to be sprayed from the nozzle hole can be set by adjusting the supply pressure with respect to the nozzle hole having the specified hole diameter of 0.015 mm to 0.030 mm. When the spray velocity of the liquid is determined in a range of 10 m/s to 80 m/s, a velocity of the flying droplets is also determined. Since the droplet velocity is substantially the same as the spray velocity, the droplet velocity is in the range of 10 m/s to 80 m/s.

As the spray velocity of the liquid to be sprayed from the nozzle hole increases, a flow rate (ml/min) of the liquid increases. The spray velocity of the liquid increases as the supply pressure increases, and decreases as the supply pressure decreases. Therefore, the liquid flow rate (ml/min) increases as the spray velocity increases when the supply pressure is increased, and decreases as the spray velocity decreases when the supply pressure is decreased. That is, the "liquid flow rate (ml/min)" can be set by adjusting the supply pressure with respect to the nozzle hole having the specified hole diameter of 0.015 mm to 0.030 mm.

When the "liquid flow rate (ml/min)" is determined, the number of droplets (droplets/s), which is the number of the droplets generated by the continuous flow splitting into the droplets per second, can be easily obtained by calculation of dividing the "liquid flow rate (ml/min)" by the "droplet size" because the "droplet size" to be generated is determined corresponding to the hole diameter of 0.015 mm to 0.030 mm as described above. That is, when the "liquid flow rate (ml/min)" is determined, the "number of droplets (droplets/s)", that is, the "droplet frequency" is also determined.

When the spray nozzle has a plurality of holes instead of one hole, the "liquid flow rate (ml/min)" is obtained by multiplying the number of the holes of the spray nozzle. This also applies to the following description.

As can be understood from the above description, in the liquid spray device according to the present disclosure, by adjusting the supply pressure of the pressurized liquid supply unit with respect to a nozzle hole having a hole diameter in a range of 0.015 mm to 0.030 mm, the spray velocity of a liquid can be set in a range of 10 m/s to 80 m/s, and the droplet frequency can be set in a range of $0.8\times10^5$ to $9.0\times10^5$.

That is, a liquid having a viscosity of 0.6 mPa·s to 4.0 mPa·s can be repeatedly applied to an object such as skin as flying droplets having a velocity in a range of 10 m/s to 80 m/s and a droplet frequency in a range of $0.8\times10^5$ to $9.0\times10^5$.

According to the present aspect, as can be understood from the above description, by using a liquid having a viscosity in the above range for a nozzle hole having a hole diameter in a range of 0.015 mm to 0.030 mm, droplets of the above number of droplets (droplets/s) generated from the liquid can fly at the above velocity and be sequentially applied to an object such as skin. This makes it possible to effectively clean an object such as skin.

Since physical stimulation can be applied to the skin by collision of droplets at a droplet frequency, that is, at the number of droplets (droplets/s), comparable to that of ultrasonic waves, improvement of skin conditions such as moisturizing and elasticity, that is, skin care can be expected.

As described later, the present inventors confirmed that skin cleaning can be effectively performed by flying droplets generated from a liquid having the above viscosity and a surface tension at the above velocity and the above number of droplets (droplets/s) and applying the droplets to skin.

According to a liquid spray device of a second aspect of the present disclosure, in the first aspect, the liquid has a viscosity of 0.65 mPa·s to 3.3 mPa·s, a velocity of the liquid to be sprayed from the nozzle hole is in a range of 19 m/s to 63 m/s, and the number of droplets (droplets/s) is in a range of $1.3\times10^5$ to $7.1\times10^5$.

According to the present aspect, the liquid has a viscosity of 0.65 mPa·s to 3.3 mPa·s, the velocity of the liquid to be sprayed from the nozzle hole is in a range of 19 m/s to 63 m/s, and the number of droplets (droplets/s) is in a range of $1.3\times10^5$ to $7.1\times10^5$. Accordingly, the effect of the first aspect can be obtained more effectively.

According to a liquid spray device of a third aspect of the present disclosure, in the first aspect or the second aspect, a droplet forming distance at which the continuous flow splits into droplets is 20 mm or less.

Here, the "droplet forming distance" means a distance at which a continuous flow, which is sprayed as a continuous flow from an end surface of a spray nozzle on a liquid spray side, splits into droplets.

The droplet forming distance is longer when the supply pressure is increased, and is shorter when the supply pressure is decreased. By adjusting the supply pressure, the droplet forming distance can be set to 20 mm or less.

According to the present aspect, since the droplet forming distance is set to 20 mm or less, it is possible to obtain an effect that droplets are easily applied to a target portion of an object such as skin.

A liquid spray device according to a fourth aspect of the present disclosure includes a spray nozzle having at least one nozzle hole configured to spray a liquid, a pressurized liquid supply unit configured to pressurize a liquid and feed the pressurized liquid to the spray nozzle, and a controller configured to control an operation of the pressurized liquid supply unit such that the liquid to be sprayed from the nozzle hole flies in a state of splitting into droplets from a continuous flow. The nozzle hole has a hole diameter of 0.05 mm to 0.12 mm. The liquid has a viscosity of 0.6 mPa·s to 4.0 mPa·s. The controller controls a supply pressure of the pressurized liquid supply unit such that a velocity of the liquid to be sprayed from the nozzle hole is 10 m/s to 70 m/s, and that the number of droplets (droplets/s), which is the number of the droplets generated by the continuous flow splitting into the droplets per second, is in a range of $0.3\times10^5$ to $4.0\times10^5$.

As can be understood from the above description of the first aspect, in the liquid spray device according to the present disclosure, by adjusting the supply pressure of the pressurized liquid supply unit with respect to a nozzle hole having a hole diameter in a range of 0.05 mm to 0.12 mm, the spray velocity of a liquid can be set in a range of 10 m/s to 70 m/s, and the droplet frequency can be set in a range of $0.3\times10^5$ to $4.0\times10^5$.

That is, a liquid having a viscosity of 0.6 mPa·s to 4.0 mPa·s can be repeatedly applied to an object such as skin, a fiber, or a metal as flying droplets having a velocity in a range of 10 m/s to 70 m/s and a droplet frequency in a range of $0.3\times10^5$ to $4.0\times10^5$.

According to the present aspect, as can be understood from the above description, by using a liquid having a viscosity in the above range for a nozzle hole having a hole diameter in a range of 0.05 mm to 0.12 mm, droplets of the above number of droplets (droplets/s) generated from the liquid can fly at the above velocity and be sequentially applied to an object such as skin, a fiber, or a metal. This makes it possible to perform processing such as effective cleaning on the object.

Since physical stimulation can be applied to the skin by collision of droplets at a droplet frequency, that is, at the number of droplets (droplets/s), comparable to that of ultrasonic waves, improvement of skin conditions such as moisturizing and elasticity, that is, skin care can be expected. For fibers or metals, an effect of softening or breaking and removing dirt or foreign matters adhering to a surface or inside of a base material without damaging the base material can be expected.

As described later, the present inventors confirmed that an appropriate treatment such as cleaning can be effectively performed on an object by flying droplets generated from a liquid having the above viscosity and a surface tension at the above velocity and the above number of droplets (droplets/s) and applying the droplets to the object.

According to a liquid spray device of a fifth aspect of the present disclosure, in the first aspect, the liquid has a viscosity of 0.65 mPa·s to 3.3 mPa·s, a velocity of the liquid to be sprayed from the nozzle hole is in a range of 14 m/s to 52 m/s, and the number of droplets (droplets/s) is in a range of $0.5\times10^5$ to $2.4\times10^5$.

According to the present aspect, the liquid has a viscosity of 0.65 mPa·s to 3.3 mPa·s, the velocity of the liquid to be sprayed from the nozzle hole is in a range of 14 m/s to 52 m/s, and the number of droplets (droplets/s) is in a range of $0.5\times10^5$ to $2.4\times10^5$. Accordingly, the effect of the first aspect can be obtained more effectively.

According to a liquid spray device of a sixth aspect of the present disclosure, in the fourth aspect, a droplet forming distance at which the continuous flow splits into droplets is 5 mm to 150 mm.

Here, the "droplet forming distance" means a distance at which a continuous flow, which is sprayed as a continuous flow from an end surface of a spray nozzle on a liquid spray side, splits into droplets.

The droplet forming distance is longer when the supply pressure is increased, and is shorter when the supply pressure is decreased. By adjusting the supply pressure, the droplet forming distance can be set to 5 mm to 150 mm.

According to the present aspect, since the droplet forming distance is set to 5 mm to 150 mm, the nozzle hole of the spray nozzle can be used close to the object, or can be used while maintaining a sufficient distance at which the nozzle hole does not come into contact with the object. Accordingly, an appropriate impact pressure can be applied to the object by controlling a droplet velocity according to the characteristics of the object.

By applying the droplets to fibers, metals, resins, or the like, it is possible to clean only dirt adhering to a surface or inside of the object without damaging a base material of the object. It is possible to obtain an effect that the droplets are easily applied to a target portion of the object.

First Embodiment

Hereinafter, a liquid spray device according to a first embodiment of the present disclosure will be described in detail with reference to FIG. 1.

A liquid spray device 25 of the present embodiment is a liquid spray device using a skin cleaning liquid suitable for cleaning the skin such as a face, an arm, a hand, a foot, and a back, or a liquid for hair used for the scalp and hair.

Needless to say, the liquid spray device 25 is not limited to a device for skin cleaning.

As shown in FIG. 1, the liquid spray device 25 according to the present embodiment includes a spray nozzle 11 having at least one nozzle hole 1 that sprays a liquid 3, a pressurized liquid supply unit 27 that pressurizes the liquid 3 and feeds the pressurized liquid 3 to the spray nozzle 11, and a controller 4 that controls an operation of the pressurized liquid supply unit 27 to cause the liquid 3 to be sprayed from the nozzle hole 1 to fly in a state of splitting into droplets 7 from a continuous flow 5.

Further, in the liquid spray device 25 according to the present embodiment, a hole diameter b of the nozzle hole 1 is 0.015 mm to 0.030 mm, and the liquid 3 to be sprayed has a viscosity of 0.6 mPa·s to 4.0 mPa·s as its property.

The controller 4 controls a supply pressure of the pressurized liquid supply unit 27 such that a spray velocity of the liquid 3 to be sprayed from the spray nozzle 11 is 10 m/s to 80 m/s, and that the number of droplets (droplets/s), which is the number of the droplets 7 generated by the continuous flow 5 splitting into the droplets 7 per second, is in a range of $0.8\times10^5$ to $9.0\times10^5$.

Specifically, the liquid spray device 25 includes a spray unit 2 including the spray nozzle 11 that sprays the liquid 3, a liquid tank 6 that stores the liquid 3 to be sprayed, a pump unit that is the pressurized liquid supply unit 27, a liquid suction tube 12 that constitutes a flow path 10 of the liquid 3 in which the liquid tank 6 is coupled to the pressurized liquid supply unit 27, and a liquid feeding tube 14 that also constitutes the flow path 10 in which the pressurized liquid supply unit 27 is coupled to the spray unit 2. In the present embodiment, the liquid suction tube 12 and the liquid feed tube 14 are made of a soft resin material, and needless to say, the liquid suction tube 12 and the liquid feeding tube 14 are not limited to the material.

In the pressurized liquid supply unit 27, a pump operation such as a pressure of the liquid 3 to be fed to the spray unit 2 through the liquid feeding tube 14 is controlled by the controller 4. That is, the supply pressure is controlled.

Properties of Liquid to be Sprayed

As described above, in the liquid spray device 25 according to the present embodiment, the liquid 3 to be sprayed has a viscosity in the range of 0.6 mPa·s to 4.0 mPa·s.

The range of the viscosity of the liquid 3 is set on the assumption that an environmental temperature at which the liquid spray device 25 is used is in a range of 5° C. to 45° C.

For example, the viscosity (mPa·s) of water is 1.519 at 5° C., 1.307 at 10° C., 1.138 at 15° C., 1.002 at 20° C., 0.890 at 25° C., 0.798 at 30° C., and 0.720 at 35° C.

When the viscosity of the liquid 3 to be used is in the range of 0.6 mPa·s to 4.0 mPa·s, in the cleaning of an object using droplets of the liquid, an effect can be expected that a desired number of droplets can be ensured and the cleaning efficiency can be improved by an appropriate and sufficient impact action both when an aqueous liquid is used and when a liquid having a viscosity higher than that of the aqueous liquid (for example, a liquid containing a hydrocarbon-based component or a synthetic compound) is used.

Spray Nozzle

In the present embodiment, in order to facilitate understanding of the description, the spray nozzle 11 has one nozzle hole 1, and the liquid 3 is sprayed from the nozzle hole 1 in a straight manner. In the view of an enlarged part in FIG. 1, a reference numeral F indicates a liquid spray direction. The nozzle hole 1 is formed in a cylindrical shape in which an outlet in the liquid spray direction F has a circular shape.

The liquid 3 sprayed from the nozzle hole 1 is the continuous flow 5 immediately after being sprayed, immediately forms droplets due to a surface tension of the liquid 3, and splits into a group of droplets 7. The group of droplets 7 flies in a straight line in the liquid spray direction F. The group of the flying droplets 7 is sequentially applied to an object 9 such as skin to clean the object.

In the view of the enlarged part in FIG. 1, dimensions of the droplets 7 and the continuous flow 5 are greatly enlarged with respect to other members in order to facilitate understanding of the drawing, and a relative dimensional relation is ignored.

Diameter of Nozzle Hole and Droplet Size

In the liquid spray device 25 according to the present embodiment, the liquid 3 is sprayed as the continuous flow 5 from the nozzle hole 1 of the spray nozzle 11 at a predetermined supply pressure, and thereafter, the continuous flow 5 splits to generate the droplets 7 while flying.

A size of the droplets 7 generated in this manner (hereinafter, also referred to as "droplet diameter") will be described in a partially overlapping manner, and it is known that the size of the droplets 7 has a relation with the hole diameter b of the nozzle hole 1 based on a non-viscous linear theory. That is, it is known that, based on the non-viscous linear theory, the droplets 7 are about 1.88 times the hole diameter b of the nozzle hole 1 regardless of a magnitude of the supply pressure. In other words, when the hole diameter b of the nozzle hole 1 is specified, the size of the droplets 7 to be generated is determined.

When the hole diameter b of the nozzle hole 1 is set to 0.015 mm to 0.030 mm, the size is calculated to be 0.0282 mm to 0.0564 mm. Further, in consideration of a slight variation due to the smoothness of the nozzle hole 1, environmental conditions, and the like, the size of the droplets 7 is about 0.03 mm to 0.1 mm in terms of an average droplet diameter.

Here, since most of the droplets 7 are actually deformed into an elliptical shape or the like rather than a perfect spherical shape, the "average droplet diameter" is obtained as an average value based on a longest diameter portion and a shortest diameter portion.

Supply Pressure and Spray Velocity

The spray velocity of the liquid 3 to be sprayed from the nozzle hole 1 increases as the supply pressure of the pressurized liquid supply unit increases, and decreases as the supply pressure decreases.

When the hole diameter b of the nozzle hole 1 is specified, the spray velocity of the liquid 3 to be sprayed from the nozzle hole 1 can be set in a range of 10 m/s to 80 m/s by adjusting the supply pressure according to the hole diameter b.

When the spray velocity of the liquid 3 is determined, a velocity of the flying droplets 7 is also determined. Since the velocity of the droplets 7 is substantially the same as the spray velocity, the velocity of the droplets 7 is 10 m/s to 80 m/s.

Supply Pressure, Spray Velocity, Liquid Flow Rate, and Number of Droplets

Since the spray velocity of the liquid 3 to be sprayed from the nozzle hole 1 increases when the supply pressure is increased, a flow rate (ml/min) of a liquid to be sprayed from the nozzle hole 1 increases. Since the spray velocity of the liquid 3 to be sprayed from the nozzle hole 1 decreases when the supply pressure is decreased, the flow rate (ml/min) of a liquid to be sprayed from the nozzle hole 1 decreases. The supply pressure and the liquid flow rate (ml/min) have such a relation.

Therefore, when the hole diameter b of the nozzle hole 1 is specified, the flow rate (ml/min) of a liquid to be sprayed from the nozzle hole 1 can be set to a specific flow rate by adjusting the supply pressure according to the hole diameter b.

When the "liquid flow rate (ml/min)" is determined, the number of droplets (droplets/s) of the droplets 7 generated by the continuous flow 5 splitting into the droplets 7 per unit time can be easily obtained by calculation of dividing the "liquid flow rate (ml/min)" by the generated "droplet size" as described above since the "droplet size" is in a range of about 0.03 mm to 0.1 mm. That is, when the "liquid flow rate (ml/min)" is determined, a "droplet frequency" is also determined.

When a plurality of nozzle holes 1 are provided instead of one nozzle hole 1, the liquid flow rate (ml/min) is obtained by multiplying the number of the nozzle holes 1. This also applies to the following description.

As can be understood from the above description, in the liquid spray device 25, by adjusting the supply pressure of the pressurized liquid supply unit 27 with respect to a nozzle hole having the specified hole diameter b in a range of 0.015 mm to 0.030 mm, the spray velocity of the liquid 3 can be set in a range of 10 m/s to 80 m/s, and the droplet frequency can be set in a range of $0.8\times10^5$ to $9.0\times10^5$.

That is, a liquid having a viscosity of 0.6 mPa·s to 4.0 mPa·s can be repeatedly applied to the object 9 such as skin as the flying droplets 7 having a velocity of 10 m/s to 80 m/s and a droplet frequency of $0.8\times10^5$ to $9.0\times10^5$.

Specifically, when the hole diameter b of the nozzle hole 1 is, for example, 0.024 mm, the size of the droplets 7 to be generated is 0.045 mm, which is about 1.88 times the hole diameter b of the nozzle hole 1, based on the non-viscous linear theory. That is, the droplet diameter of the droplets 7 is about 0.05 mm.

When the supply pressure is adjusted such that the spray velocity of the liquid 3, that is, the velocity of the flying droplets 7 is 10 m/s, a flow rate (ml/min) of a liquid to be supplied per nozzle hole is about 0.3, and the number of droplets generated per second (droplets/s) is about $1.0\times10^5$.

When the supply pressure is adjusted such that the spray velocity of the liquid 3, that is, the velocity of the flying droplets 7 is 19 m/s, a flow rate (ml/min) of a liquid to be supplied per nozzle hole is about 0.51, and the number of droplets generated per second (droplets/s) is about $1.8\times10^5$.

When the supply pressure is adjusted such that the spray velocity of the liquid 3, that is, the velocity of the flying droplets 7 is 63 m/s, a flow rate (ml/min) of a liquid to be supplied per nozzle hole is about 1.7, and the number of droplets generated per second (droplets/s) is about $5.9\times10^5$.

When the supply pressure is adjusted such that the spray velocity of the liquid 3, that is, the velocity of the flying droplets 7 is 80 m/s, a flow rate (ml/min) of a liquid to be supplied per nozzle hole is about 2.2, and the number of droplets generated per second (droplets/s) is about $7.6\times10^5$.

In the liquid spray device 25 according to the present embodiment, the pressurized liquid supply unit 27 supplies the liquid 3 at a supply pressure at which the supply pressure of the liquid 3 to be sprayed from the nozzle hole 1 is 0.3 MPa to 3.2 MPa.

The controller 4 controls the supply pressure of the pressurized liquid supply unit 27 such that a spray velocity V of the liquid 3 to be sprayed from the nozzle hole 1 is 10 m/s to 80 m/s. When the supply pressure is in a range of 0.3 MPa to 3.2 MPa, a state in which the spray velocity V of the liquid 3 is 10 m/s to 80 m/s is easily achieved. Since the spray velocity V of the liquid 3 may be 10 m/s to 80 m/s, the supply pressure is not limited to the range of 0.3 MPa to 3.2 MPa.

There is a correlation between the supply pressure and the spray velocity V. When the supply pressure is 2.4 MPa, the spray velocity V is approximately 60 m/s, and when the supply pressure is 3.2 MPa, the spray velocity V is approximately 80 m/s.

In the present embodiment, since the liquid spray device 25 for skin cleaning is used, the supply pressure is set according to the hole diameter b of the nozzle hole 1 such that a droplet forming distance is 20 mm or less. The "droplet forming distance" means a distance at which the continuous flow 5, which is sprayed as the continuous flow 5 from an end surface 13 of the spray nozzle 11 on a side where the liquid 3 is sprayed, splits into the droplets 7.

A structure for vibrating the continuous flow 5 to be sprayed may be provided in the spray nozzle 11 so that the droplet forming distance can be adjusted by the vibration in addition to the control of the supply pressure.

In the present embodiment, the liquid 3 is a facial wash or a liquid for hair (for example, a hair growth agent or a hair styling product) containing glycerin, and a cosmetic lotion, water containing an anti-inflammatory component, or mixed water containing a sterilizing component may be used.

The liquid 3 may contain a vitamin B2 or B6 component for reducing skin inflammation, anti-inflammatory components such as ibuprofen piconol and dipotassium glycyrrhizinate, and bactericidal components such as resorcin, isopropylmethylphenol, and ethanol.

Specific Description

Figure 2:
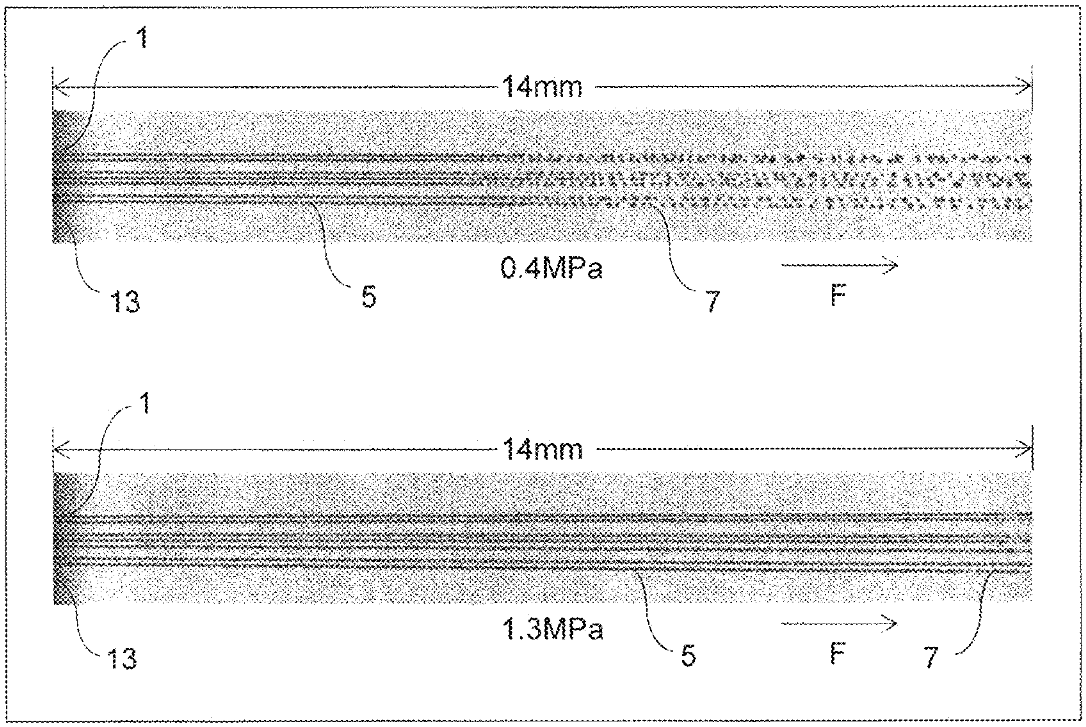
FIG. 2 is a high-speed captured image obtained by capturing a moving state of a continuous flow and droplets when a supply pressure of a liquid is 0.4 MPa and 1.3 MPa in the first embodiment.

FIG. 2 is a high-speed captured image obtained by capturing a spray state, that is, a flight trajectory of the droplets 7 using a high-speed camera when the hole diameter b of the nozzle hole 1 is 0.024 mm and the supply pressure of the liquid 3 is 0.4 MPa (upper image) and 1.3 MPa (lower image).

It can be seen that when the supply pressure of the liquid 3 is 1.3 MPa, the droplet forming distance is about 20 mm or less, which is needless to say, and is 15 mm or less.

Analysis Value

FIG. 3 shows analysis images obtained by performing image processing of binarization in order to evaluate spray and droplet characteristics based on a droplet image obtained by capturing a representative spray state of a liquid at a high speed in the same manner as in FIG. 2.

Free software (ImageJ) was used for the image processing. In the image processing, the captured image was subjected to binarization, an area in which droplets were formed was selected as an analysis area, and the number of areas of each of the droplets 7 in the analysis area and coordinates of a center 15 of each of the droplets 7 were obtained.

Droplet Forming Distance

Figure 3A:
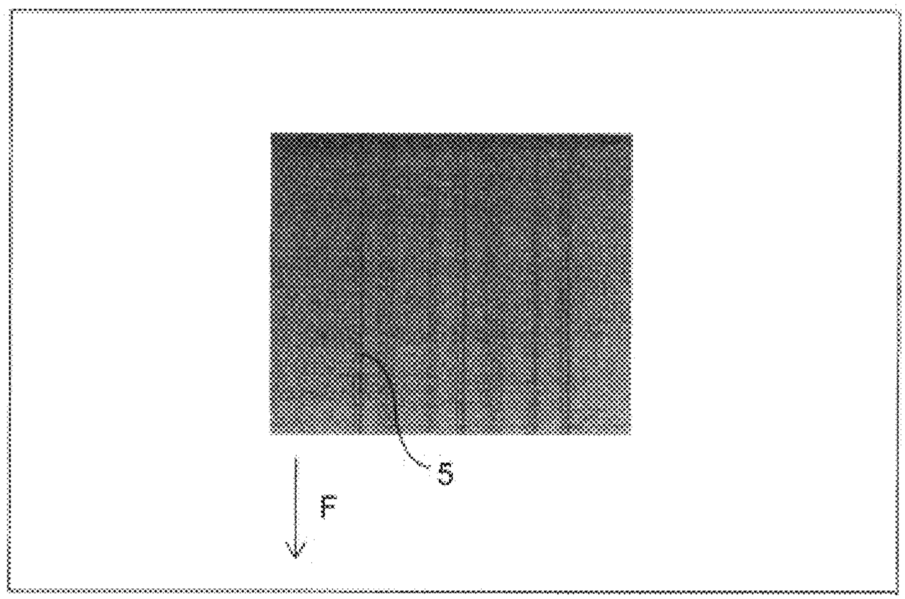
FIG. 3A is a high-speed captured image of a continuous flow at an outlet of a nozzle hole captured by aligning an upper end surface of a capturing angle of view with an end surface of a member in which a spray nozzle is housed.
Figure 3B:
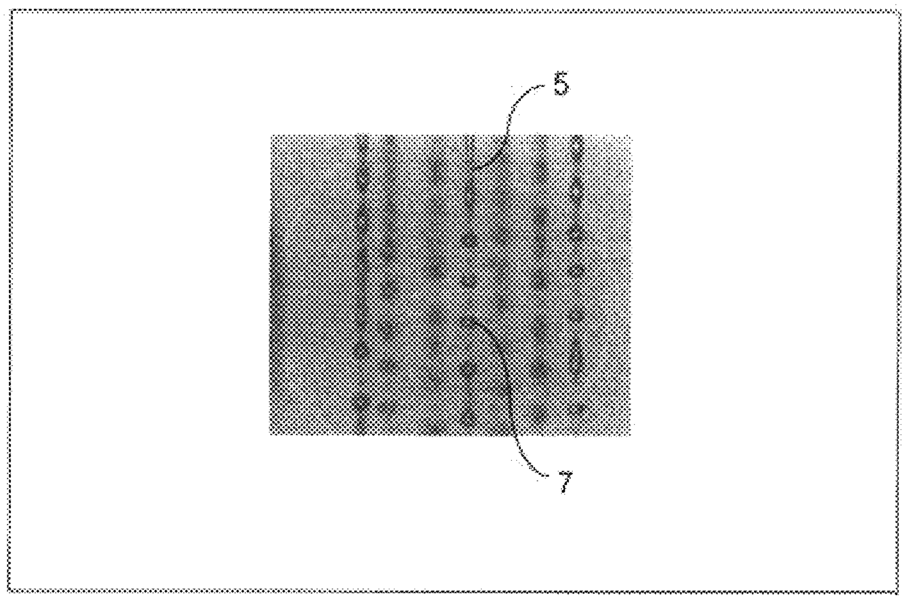
FIG. 3B is a high-speed captured image in a state of the transition of droplet formation in which the continuous flow and the droplets are mixed.
Figure 3C:
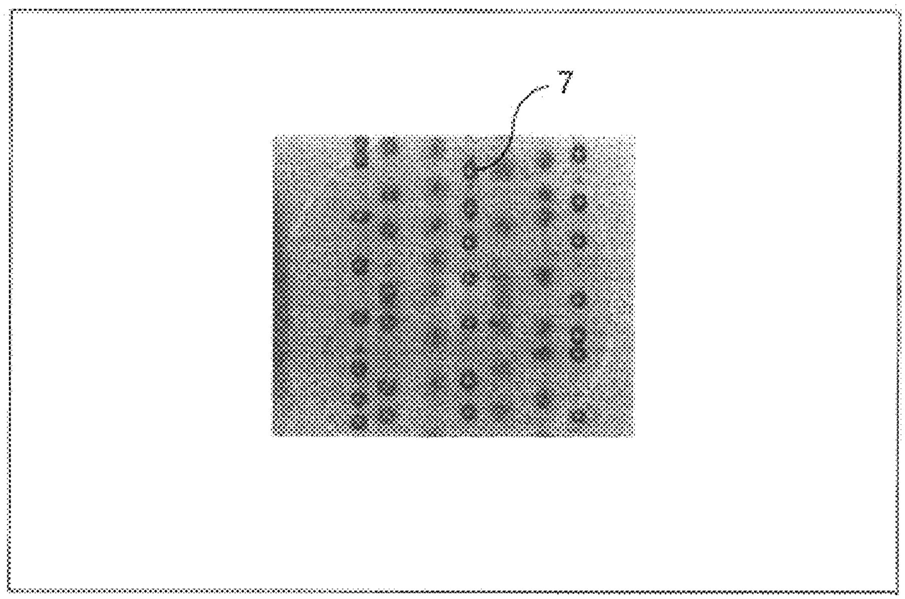
FIG. 3C is a high-speed captured image in a state in which a continuous flow is completely split into droplets.

FIG. 3A is a high-speed captured image of the continuous flow 5 at the outlet of the nozzle hole 1 captured by aligning an upper end surface of a capturing angle of view with an end surface of a member in which the spray nozzle 11 is housed, FIG. 3B is a high-speed captured image in a state of the transition of droplet formation in which the continuous flow 5 and the droplets 7 are mixed, and FIG. 3C is a high-speed captured image in a state in which the continuous flow 5 is completely split into the droplets 7.

The droplet forming distance was determined based on a distance moved by the continuous flow 5 from the state of FIG. 3A to the state of FIG. 3C.

When the hole diameter b of the nozzle hole 1 is 0.024 mm, the linearity of the droplets 7 was good, and the droplet forming distance is 20 mm or less by adjusting the supply pressure.

In the flying droplets 7, a maximum value of axial deviation of the center 15 of the droplets with respect to a central axis 17 of the spray nozzle 1 is 0.2 mm. Therefore, the droplets 7 can be applied to a target portion.

Velocity of Droplets

Figure 4:
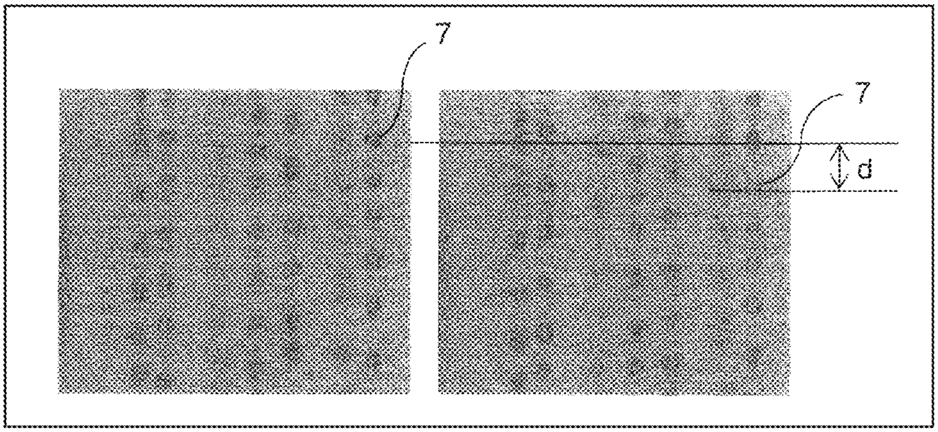
FIG. 4 is a high-speed captured image showing a method for obtaining a droplet velocity.

As shown in FIG. 4, a droplet velocity was obtained by selecting two images from images obtained by capturing a state in which the continuous flow 5 completely splits into the droplets 7 and flies using a high-speed camera, and dividing a moving distance d of the focused droplets 7 by a capturing time interval of the two images.

The moving distance d was determined based on a length per pixel, which is determined based on a dimension of an angle of view of a captured image, and the capturing time interval was determined based on a capturing speed (frame rate).

When the hole diameter b of the nozzle hole 1 is 0.024 mm, the droplet velocity could be about 60 m/s or less when the supply pressure was 2.4 MPa or less. Accordingly, it is possible to prevent an impact pressure of the droplets 7 from being too large, and it is possible to apply the droplets 7 with ease to an application site such as the skin or the scalp.

Droplet Frequency (Number of Droplets (Droplets/s))

Figure 5:
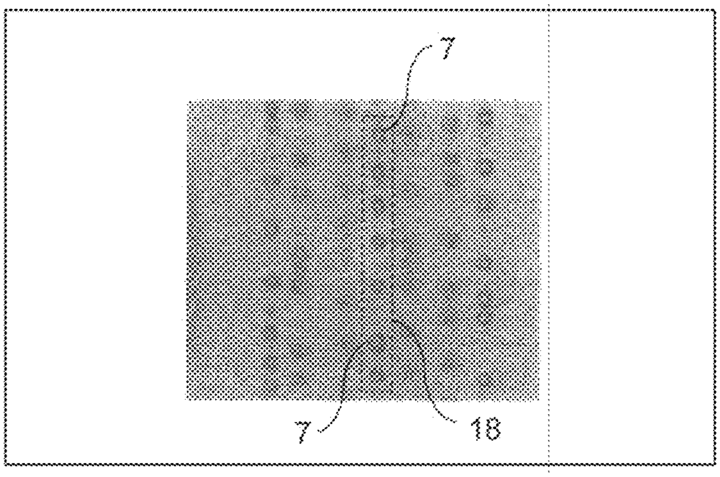
FIG. 5 is a high-speed captured image showing a method for obtaining a droplet frequency.

As shown in FIG. 5, the droplet frequency (=the number of droplets per second) was obtained by calculating an average number of droplets present within an angle of view of a captured image, dividing a dimension (length) of the angle of view by the number of droplets to calculate an average distance between the droplets, and dividing the droplet velocity by the average distance between the droplets. For example, in FIG. 5, the average number of droplets that are formed in the nozzle hole 1 and correspond to the droplets 7 in a rectangular frame 18 is seven. The average number of droplets in the other nozzle holes 1 is almost the same, that is, seven.

The average distance was calculated based on a length per pixel, which is determined based on a dimension of an angle of view of a captured image.

The droplet frequency increases as the velocity of the droplets increases. Therefore, by changing the velocity of the droplets, a large impact action can be achieved, and cleaning can be performed more efficiently.

As described above, when the droplets 7 are applied to the object 9 at the above droplet velocity and the above droplet frequency (the number of droplets (droplets/s)), dirt on an application site of the object 9, for example, dirt or sebum accumulated on the skin or the scalp, particularly on the base of hair is emulsified and softened to be easily removed due to the impact action. When a toner, a lotion, a hair growth agent, or the like is used as the liquid 3, the droplets 7 of the liquid 3 are efficiently applied to stratum corneum, pores, hair roots, and the like, and an action of skin care or scalp care can also be obtained. Accordingly, the elasticity and a moisturizing state of skin can be favorably maintained.

Table 1 shows a plurality of evaluated liquids and physical property values of viscosities thereof. Table 2 shows measured values of the droplet frequency and the droplet velocity obtained by evaluating a liquid A to a liquid E shown in Table 1 in the spray nozzle 11 having a hole diameter b of the nozzle hole 1 (hereinafter, also referred to as "nozzle diameter b") of 0.015 mm, 0.024 mm, and 0.03 mm. Table 3 shows measured values of the supply pressure (hereinafter, also referred to as "spray pressure") and the droplet forming distance for the liquid A to the liquid E shown in Table 1 in the spray nozzle 11 having the nozzle diameter b of 0.015 mm, 0.024 mm, and 0.03 mm.

Tables 2 and 3 correspond to each other. That is, the droplet frequency and the droplet velocity in Table 2 are measured values corresponding to the respective supply pressures in Table 3.

The viscosities were measured using a viscoelasticity meter AR-G2 (manufactured by TA Instruments Japan Inc., temperature: 20° C.)

TABLE 1

| Evaluated liquid | Viscosity [mPa · s] |
|---|---|
| A | 3.27 |
| B | 2.50 |
| C | 0.97 |
| D | 1.20 |
| E | 1.47 |
| X | 3.18 |
| Y | 2.67 |
| Pure water at 20° C. | 1.00 |
| Pure water at 40° C. | 0.65 |

TABLE 2

| | Nozzle diameter: ϕ0.015 mm | | Nozzle diameter: ϕ0.024 mm | | Nozzle diameter: ϕ0.03 nm | |
|---|---|---|---|---|---|---|
| Evaluated liquid | Measured droplet frequency (Droplets/s) | Measured droplet velocity (m/s) | Measured droplet frequency (Droplets/s) | Measured droplet velocity (m/s) | Measured droplet frequency (Droplets/s) | Measured droplet velocity (m/s) |
| A | 2.95E+05 | 26.1 | 1.79E+05 | 22.7 | 1.69E+05 | 24.9 |
| | 3.85E+05 | 34.0 | 2.24E+05 | 28.3 | 1.92E+05 | 28.3 |

TABLE 2-continued

| Evaluated liquid | Nozzle diameter: φ0.015 mm Measured droplet frequency (Droplets/s) | Nozzle diameter: φ0.015 mm Measured droplet velocity (m/s) | Nozzle diameter: φ0.024 mm Measured droplet frequency (Droplets/s) | Nozzle diameter: φ0.024 mm Measured droplet velocity (m/s) | Nozzle diameter: φ0.03 nm Measured droplet frequency (Droplets/s) | Nozzle diameter: φ0.03 nm Measured droplet velocity (m/s) |
|---|---|---|---|---|---|---|
| | 4.74E+05 | 41.9 | 2.42E+05 | 30.6 | 2.08E+05 | 30.6 |
| | 5.26E+05 | 46.5 | 3.05E+05 | 38.5 | 2.31E+05 | 34.0 |
| | 6.41E+05 | 56.7 | 3.41E+05 | 43.1 | 2.38E+05 | 35.1 |
| B | 1.74E+05 | 19.3 | 1.54E+05 | 22.7 | 1.46E+05 | 21.5 |
| | 2.15E+05 | 23.8 | 2.00E+05 | 29.5 | 1.69E+05 | 24.9 |
| | 2.77E+05 | 30.6 | 2.31E+05 | 34.0 | 1.92E+05 | 28.3 |
| | 3.08E+05 | 34.0 | 2.69E+05 | 39.7 | 2.08E+05 | 30.6 |
| | 3.59E+05 | 39.7 | 3.00E+05 | 44.2 | 2.23E+05 | 32.9 |
| | | | | | 2.69E+05 | 39.7 |
| C | 3.53E+05 | 28.3 | 2.21E+05 | 24.4 | 1.54E+05 | 22.7 |
| | 4.37E+05 | 35.1 | 2.62E+05 | 28.9 | 1.69E+05 | 24.9 |
| | 5.22E+05 | 41.9 | 3.23E+05 | 35.7 | 1.77E+05 | 26.1 |
| | 5.78E+05 | 46.5 | 3.69E+05 | 40.8 | 1.85E+05 | 27.2 |
| | | | 4.05E+05 | 44.8 | 2.00E+05 | 29.5 |
| | | | | | 2.92E+05 | 43.1 |
| D | 2.69E+05 | 23.8 | 2.26E+05 | 24.9 | 1.62E+05 | 23.8 |
| | 3.33E+05 | 29.5 | 2.67E+05 | 29.5 | 1.85E+05 | 27.2 |
| | 3.85E+05 | 34.0 | 3.18E+05 | 35.1 | 2.08E+05 | 30.6 |
| | 4.49E+05 | 39.7 | 3.38E+05 | 37.4 | 2.15E+05 | 31.7 |
| | 5.26E+05 | 46.5 | 4.10E+05 | 45.3 | 2.46E+05 | 36.3 |
| E | 3.08E+05 | 27.2 | 2.46E+05 | 27.2 | 1.31E+05 | 19.3 |
| | 3.85E+05 | 34.0 | 2.67E+05 | 29.5 | 1.38E+05 | 20.4 |
| | 5.51E+05 | 48.7 | 3.28E+05 | 36.3 | 1.92E+05 | 28.3 |
| | 6.03E+05 | 53.3 | 3.59E+05 | 39.7 | 2.31E+05 | 34.0 |
| | 7.05E+05 | 62.3 | 4.21E+05 | 46.5 | 2.31E+05 | 34.0 |
| | | | | | 2.46E+05 | 36.3 |

TABLE 3

| Evaluated liquid | Nozzle diameter: φ0.015 mm Spray pressure (MPa) | Nozzle diameter: φ0.015 mm Droplet forming distance (mm) | Nozzle diameter: φ0.024 mm Spray pressure (MPa) | Nozzle diameter: φ0.024 mm Droplet forming distance (mm) | Nozzle diameter: φ0.03 mm Spray pressure (MPa) | Nozzle diameter: φ0.03 mm Droplet forming distance (mm) |
|---|---|---|---|---|---|---|
| A | 0.6 | 6.0 | 0.4 | 8.5 | 0.5 | 11.0 |
| | 1.1 | 8.5 | 0.6 | 10 | 0.6 | 12.5 |
| | 1.4 | 10.0 | 0.8 | 11.5 | 0.7 | 13.5 |
| | 1.8 | 11.5 | 1 | 14 | 0.8 | 15.0 |
| | 2.3 | 13.0 | 1.2 | 16 | 0.9 | 16.0 |
| B | 0.4 | 3.0 | 0.4 | 5.5 | 0.5 | 5.0 |
| | 0.6 | 3.5 | 0.6 | 6.5 | 0.7 | 5.5 |
| | 0.8 | 4.0 | 0.8 | 7 | 0.8 | 5.5 |
| | 1 | 3.5 | 1 | 8 | 0.9 | 6.0 |
| | 1.3 | 4.0 | 1.2 | 9 | 1 | 6.0 |
| | | | | | 1.2 | 6.5 |
| C | 0.6 | 2.0 | 0.3 | 4 | 0.3 | 5.0 |
| | 0.8 | 2.5 | 0.4 | 5 | 0.4 | 5.5 |
| | 1.1 | 3.5 | 0.6 | 6 | 0.5 | 6.5 |
| | 1.4 | 3.5 | 0.8 | 7 | 0.6 | 7.0 |
| | | | 1 | 8 | 0.7 | 7.5 |
| | | | | | 1.0 | 8.5 |
| D | 0.3 | 4.5 | 0.2 | 8 | 0.3 | 11.0 |
| | 0.5 | 5.5 | 0.4 | 10 | 0.4 | 11.0 |
| | 0.7 | 7.0 | 0.5 | 11.5 | 0.5 | 12.0 |
| | 0.9 | 8.0 | 0.7 | 13 | 0.6 | 13.0 |
| | 1.2 | 9.0 | 0.9 | 15 | 0.7 | 15.5 |
| E | 0.5 | 3.5 | 0.4 | 6 | 0.4 | 4.5 |
| | 0.9 | 4.5 | 0.6 | 7 | 0.6 | 6.0 |
| | 1.6 | 5.5 | 0.8 | 8 | 0.7 | 8.0 |
| | 1.9 | 7.0 | 1 | 8.5 | 0.8 | 9.0 |
| | 2.4 | 8.0 | 1.3 | 9.5 | 0.9 | 10.0 |
| | | | | | 1.1 | 11.5 |

The measured values of the droplet frequency and the droplet velocity of the liquid A to the liquid E in Table 2 were subjected to regression analysis, and a relational equation (1) with the droplet frequency $Drop_{freq}$ (droplets/s) was obtained using the nozzle diameter b (mm), the droplet velocity V (m/s), and the viscosity η (mPa·s) as parameters.

$$Drop_{freq}=2.0\times10^{5}-9.2\times10^{6}b+1.0\times10^{4}V-1.5\times10^{4}\eta \quad (1)$$

Figure 6:
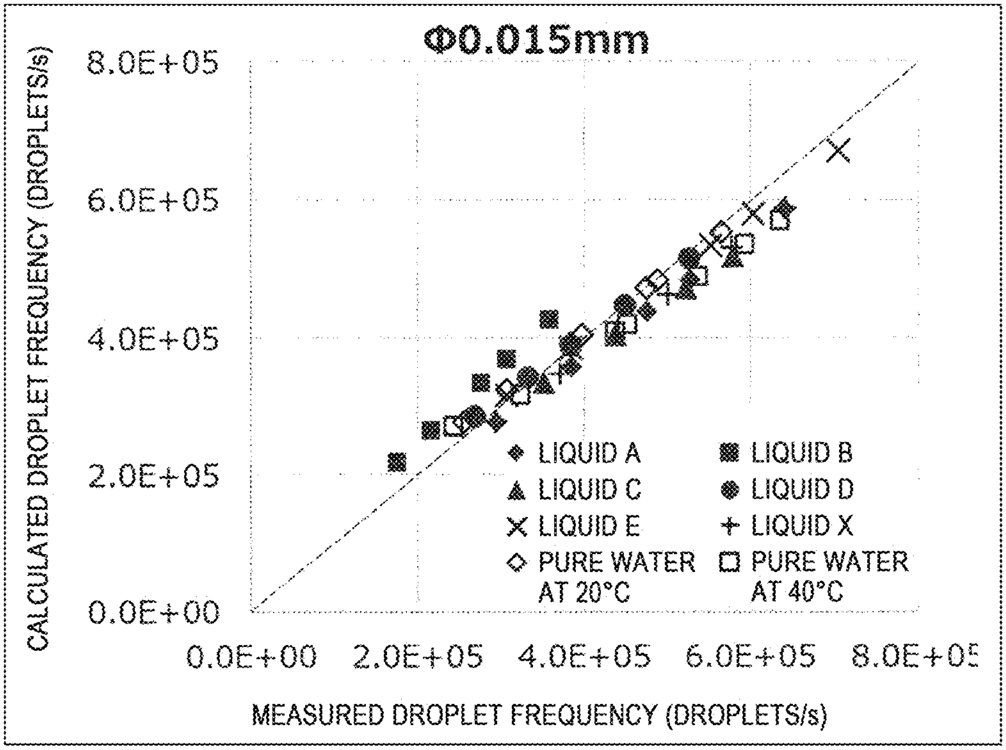
FIG. 6 is a diagram showing a relation between a measured value (measured droplet frequency) obtained by droplet frequency measurement and a calculated value (calculated droplet frequency) obtained by performing regression analysis on the measured value for a liquid A to a liquid X, pure water at 20° C., and pure water at 40° C. in Table 1 in a nozzle hole having a hole diameter of 0.015 mm.

FIG. 6 is a diagram showing a relation between a measured droplet frequency (horizontal axis) for the liquid A to a liquid X, pure water at 20° C., and pure water 40° C. subjected to the regression analysis in the spray nozzle 11 having the nozzle diameter b of 0.015 mm and a calculated value calculated by the relational equation (1), that is, a calculated droplet frequency (vertical axis). The measured droplet frequency and the calculated droplet frequency showed a fairly good linear correlation.

Figure 7:
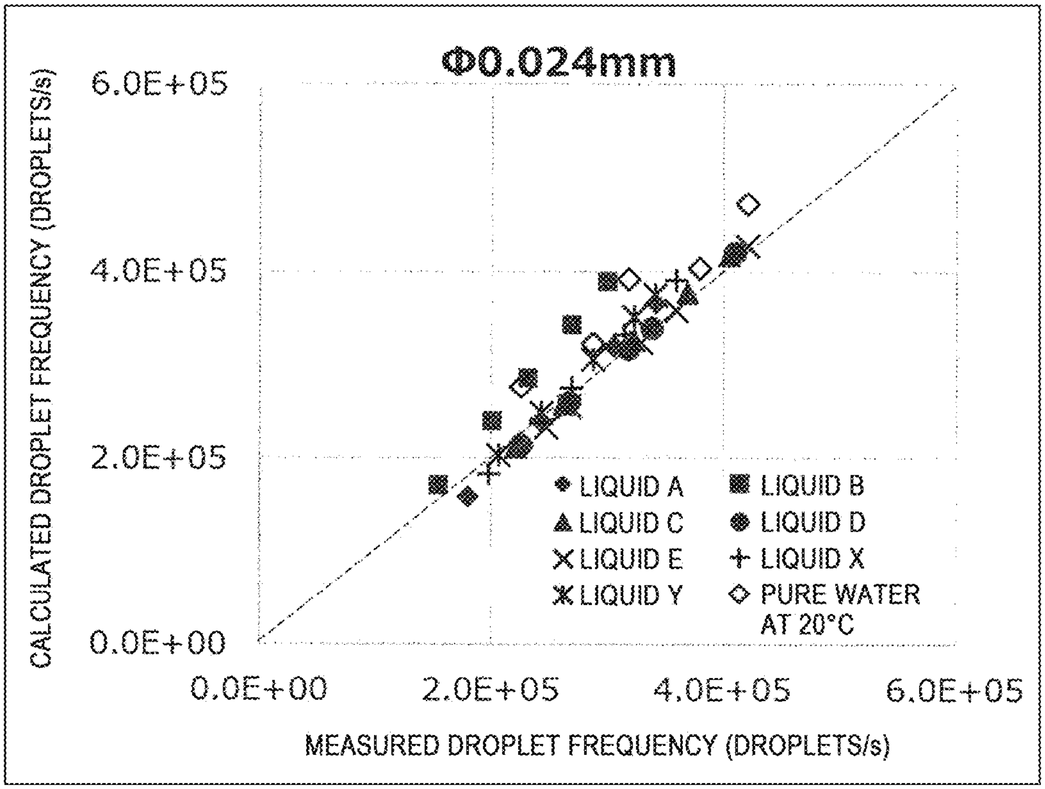
FIG. 7 is a diagram showing a relation between a measured value (measured droplet frequency) obtained by droplet frequency measurement and a calculated value (calculated droplet frequency) obtained by performing regression analysis on the measured value for the liquid A to a liquid Y and the pure water at 20° C. in Table 1 in a nozzle hole having a hole diameter of 0.024 mm.

FIG. 7 is a diagram showing a relation between a measured droplet frequency (horizontal axis) for the liquid A to a liquid Y and pure water at 20° C. subjected to the regression analysis in the spray nozzle 11 having the nozzle diameter b of 0.024 mm and a calculated value calculated by the relational equation (1), that is, a calculated droplet frequency (vertical axis). The measured droplet frequency and the calculated droplet frequency showed a fairly good linear correlation.

Figure 8:
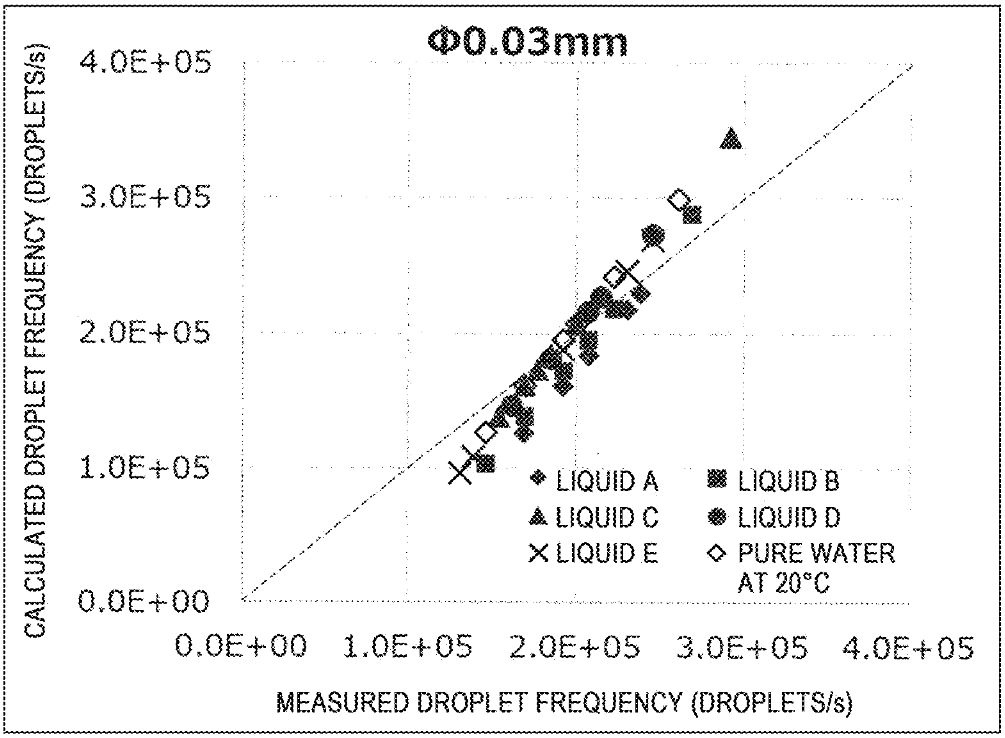
FIG. 8 is a diagram showing a relation between a measured value (measured droplet frequency) obtained by droplet frequency measurement and a calculated value (calculated droplet frequency) obtained by performing regression analysis on the measured value for the liquid A to a liquid E and the pure water at 20° C. in Table 1 in a nozzle hole having a hole diameter of 0.03 mm.

FIG. 8 is a diagram showing a relation between a measured droplet frequency (horizontal axis) for the liquid A to the liquid E and pure water at 20° C. subjected to the regression analysis in the spray nozzle 11 having the nozzle diameter b of 0.03 mm and a calculated value calculated by the relational equation (1), that is, a calculated droplet frequency (vertical axis). The measured droplet frequency and the calculated droplet frequency showed a fairly good linear correlation.

Next, the droplet frequency was calculated using the relational equation (1) for the other liquids of the liquid X, the liquid Y, the pure water at 20° C., and the pure water at 40° C., which are liquids having known physical properties and not applied to the regression analysis.

Figure 9:
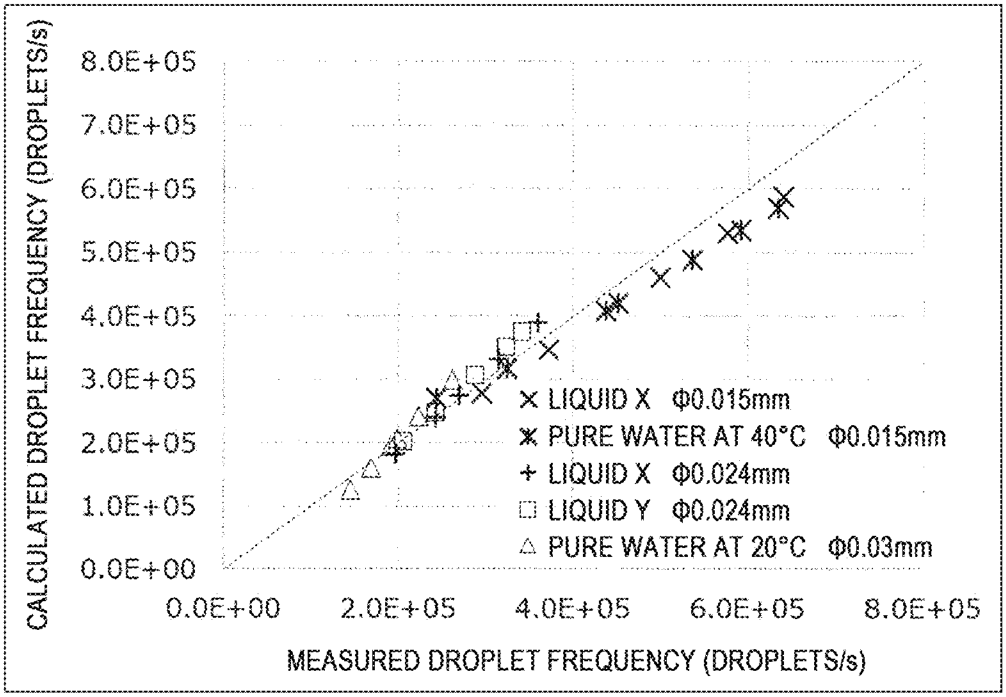
FIG. 9 is a diagram showing a relation between the measured droplet frequency and the calculated droplet frequency at each hole diameter as illustrated for the liquid X, the liquid Y, the pure water at 20° C., and the pure water at 40° C. in Table 1.

FIG. 9 is a diagram showing a relation between a measured droplet frequency (horizontal axis) and a calculated droplet frequency (vertical axis) at each nozzle diameter b as illustrated for the liquid X, the liquid Y, the pure water at 20° C., and the pure water at 40° C. The broken line in FIG. 9 is a line in which the measured droplet frequency completely matches the calculated droplet frequency. As can be seen from FIG. 9, the calculated droplet frequency was equal to or slightly lower than the measured droplet frequency, and good linear correlation was observed.

Table 4 shows a measured value of the droplet frequency, a calculated value of the droplet frequency, and a ratio between the measured value and the calculated value, that is, calculated value/measured value, for the liquid A to the liquid X, the pure water at 20° C., and the pure water at 40° C. in the spray nozzle 11 having the nozzle diameter b of 0.015 mm.

Figure 10:
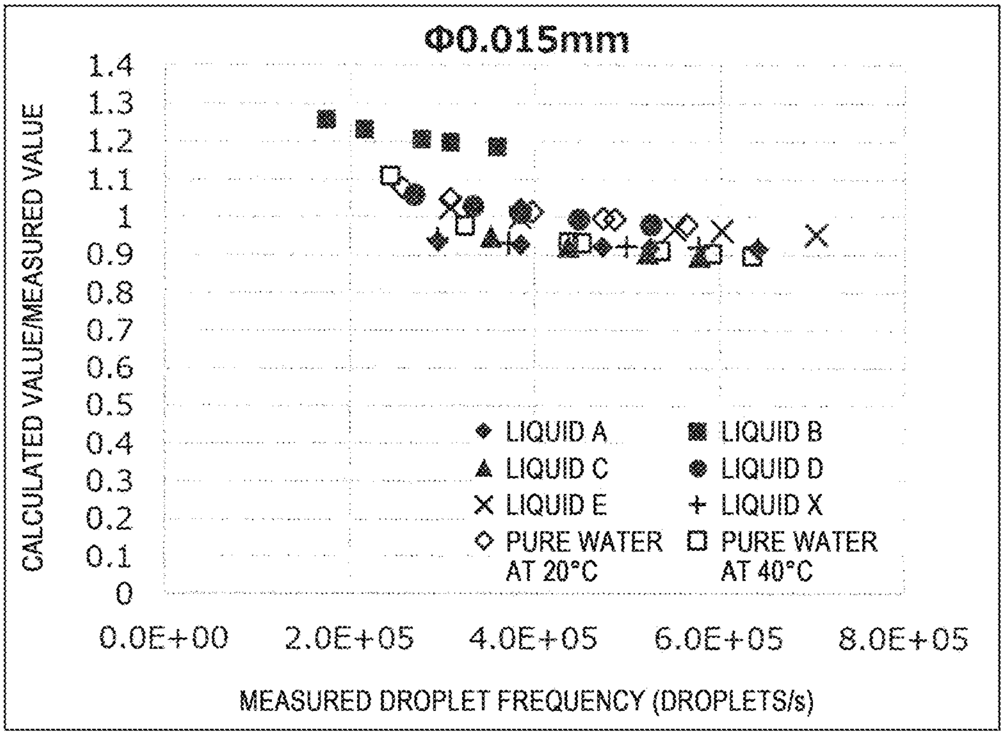
FIG. 10 is a diagram showing a relation between the measured droplet frequency and the calculated value/measured value for the liquid A to the liquid X, the pure water at 20° C., and the pure water at 40° C. in Table 1 in the nozzle hole having a hole diameter of 0.015 mm.

FIG. 10 shows a relation between the measured droplet frequency (horizontal axis) and the calculated value/measured value (vertical axis) for the liquid A to the liquid X, the pure water at 20° C., and the pure water at 40° C. in the spray nozzle 11 having the nozzle diameter b of 0.015 mm.

TABLE 4

| Nozzle diameter (mm) | Evaluated liquid | Measured droplet frequency (Droplets/s) | Calculated droplet frequency (Droplets/s) | Calculated value/ measured value |
|---|---|---|---|---|
| φ0.015 | A | 2.95E+05 | 2.76E+05 | 0.94 |
| | | 3.85E+05 | 3.57E+05 | 0.93 |
| | | 4.74E+05 | 4.37E+05 | 0.92 |
| | | 5.26E+05 | 4.83E+05 | 0.92 |
| | | 6.41E+05 | 5.87E+05 | 0.92 |
| | B | 1.74E+05 | 2.19E+05 | 1.26 |
| | | 2.15E+05 | 2.65E+05 | 1.23 |
| | | 2.77E+05 | 3.34E+05 | 1.21 |
| | | 3.08E+05 | 3.69E+05 | 1.20 |
| | | 3.59E+05 | 4.26E+05 | 1.19 |
| | C | 3.53E+05 | 3.35E+05 | 0.95 |
| | | 4.37E+05 | 4.04E+05 | 0.92 |
| | | 5.22E+05 | 4.73E+05 | 0.91 |
| | | 5.78E+05 | 5.19E+05 | 0.90 |
| | D | 2.69E+05 | 2.85E+05 | 1.06 |
| | | 3.33E+05 | 3.43E+05 | 1.03 |
| | | 3.85E+05 | 3.89E+05 | 1.01 |
| | | 4.49E+05 | 4.46E+05 | 0.99 |
| | | 5.26E+05 | 5.15E+05 | 0.98 |
| | E | 3.08E+05 | 3.16E+05 | 1.03 |
| | | 3.85E+05 | 3.85E+05 | 1.00 |
| | | 5.51E+05 | 5.34E+05 | 0.97 |
| | | 6.03E+05 | 5.80E+05 | 0.96 |
| | | 7.05E+05 | 6.72E+05 | 0.95 |
| | X | 2.95E+05 | 2.78E+05 | 0.94 |
| | | 3.72E+05 | 3.47E+05 | 0.93 |
| | | 5.00E+05 | 4.62E+05 | 0.92 |
| | | 5.77E+05 | 5.31E+05 | 0.92 |
| | | 6.41E+05 | 5.89E+05 | 0.92 |
| | Pure water at 20° C. | 2.56E+05 | 2.77E+05 | 1.08 |
| | | 3.08E+05 | 3.23E+05 | 1.05 |
| | | 3.85E+05 | 3.92E+05 | 1.02 |
| | | 3.97E+05 | 4.03E+05 | 1.01 |
| | | 4.74E+05 | 4.72E+05 | 1.00 |
| | | 4.87E+05 | 4.84E+05 | 0.99 |
| | | 5.64E+05 | 5.53E+05 | 0.98 |
| | Pure water at 40° C. | 2.44E+05 | 2.71E+05 | 1.11 |
| | | 3.24E+05 | 3.17E+05 | 0.98 |
| | | 4.37E+05 | 4.09E+05 | 0.93 |
| | | 4.51E+05 | 4.20E+05 | 0.93 |
| | | 5.36E+05 | 4.89E+05 | 0.91 |
| | | 5.92E+05 | 5.35E+05 | 0.90 |
| | | 6.35E+05 | 5.70E+05 | 0.90 |

Table 5 shows a measured value of the droplet frequency, a calculated value of the droplet frequency, and a ratio between the measured value and the calculated value, that is, calculated value/measured value, for the liquid A to the liquid Y and the pure water at 20° C. in the spray nozzle 11 having the nozzle diameter b of 0.024 mm.

Figure 11:
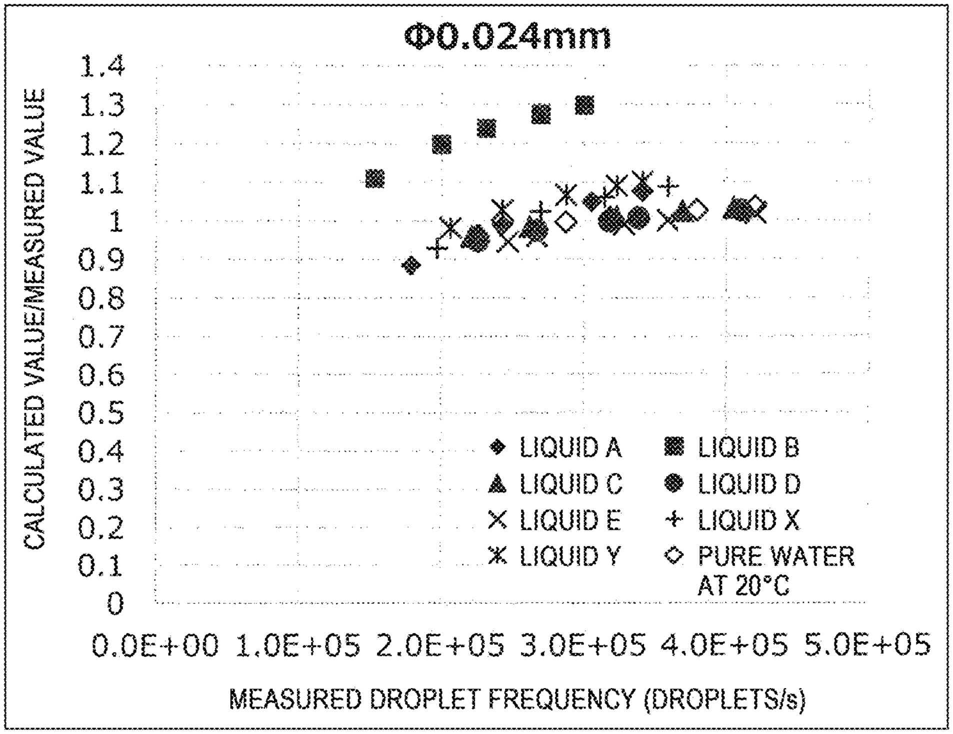
FIG. 11 is a diagram showing a relation between the measured droplet frequency and the calculated value/measured value for the liquid A to the liquid Y and the pure water at 20° C. in Table 1 in the nozzle hole having a hole diameter of 0.024 mm.

FIG. 11 shows a relation between the measured droplet frequency (horizontal axis) and the calculated value/measured value (vertical axis) for the liquid A to the liquid Y and the pure water at 20° C. in the spray nozzle 11 having the nozzle diameter b of 0.024 mm.

TABLE 5

| Nozzle diameter (mm) | Evaluated liquid | Measured droplet frequency (Droplets/s) | Calculated droplet frequency (Droplets/s) | Calculated value/ measured value |
|---|---|---|---|---|
| φ0.024 | A | 1.79E+05 | 1.59E+05 | 0.88 |
| | | 2.24E+05 | 2.16E+05 | 0.96 |
| | | 2.42E+05 | 2.39E+05 | 0.99 |
| | | 3.05E+05 | 3.20E+05 | 1.05 |
| | | 3.41E+05 | 3.66E+05 | 1.07 |
| | B | 1.54E+05 | 1.71E+05 | 1.11 |
| | | 2.00E+05 | 2.40E+05 | 1.20 |
| | | 2.31E+05 | 2.86E+05 | 1.24 |
| | | 2.69E+05 | 3.43E+05 | 1.27 |
| | | 3.00E+05 | 3.89E+05 | 1.30 |
| | C | 2.21E+05 | 2.11E+05 | 0.96 |
| | | 2.62E+05 | 2.57E+05 | 0.98 |
| | | 3.23E+05 | 3.26E+05 | 1.01 |
| | | 3.69E+05 | 3.78E+05 | 1.02 |
| | | 4.05E+05 | 4.18E+05 | 1.03 |
| | D | 2.26E+05 | 2.14E+05 | 0.95 |
| | | 2.67E+05 | 2.60E+05 | 0.97 |
| | | 3.18E+05 | 3.17E+05 | 1.00 |
| | | 3.38E+05 | 3.40E+05 | 1.01 |
| | | 4.10E+05 | 4.21E+05 | 1.03 |
| | E | 2.46E+05 | 2.33E+05 | 0.94 |
| | | 2.67E+05 | 2.56E+05 | 0.96 |
| | | 3.28E+05 | 3.25E+05 | 0.99 |
| | | 3.59E+05 | 3.59E+05 | 1.00 |
| | | 4.21E+05 | 4.28E+05 | 1.02 |
| | X | 1.97E+05 | 1.83E+05 | 0.93 |
| | | 2.42E+05 | 2.41E+05 | 0.99 |
| | | 2.69E+05 | 2.75E+05 | 1.02 |
| | | 3.14E+05 | 3.33E+05 | 1.06 |
| | | 3.59E+05 | 3.90E+05 | 1.09 |
| | Y | 2.06E+05 | 2.03E+05 | 0.98 |
| | | 2.42E+05 | 2.49E+05 | 1.03 |
| | | 2.87E+05 | 3.06E+05 | 1.07 |
| | | 3.23E+05 | 3.52E+05 | 1.09 |
| | | 3.41E+05 | 3.75E+05 | 1.10 |
| | Pure water at 20° C. | 2.26E+05 | 2.17E+05 | 0.96 |
| | | 2.87E+05 | 2.86E+05 | 0.99 |
| | | 3.18E+05 | 3.20E+05 | 1.01 |
| | | 3.79E+05 | 3.89E+05 | 1.03 |
| | | 4.21E+05 | 4.35E+05 | 1.04 |

Table 6 shows a measured value of the droplet frequency, a calculated value of the droplet frequency, and a ratio between the measured value and the calculated value, that is, calculated value/measured value, for the liquid A to the liquid E and the pure water at 20° C. in the spray nozzle 11 having the nozzle diameter b of 0.03 mm.

Figure 12:
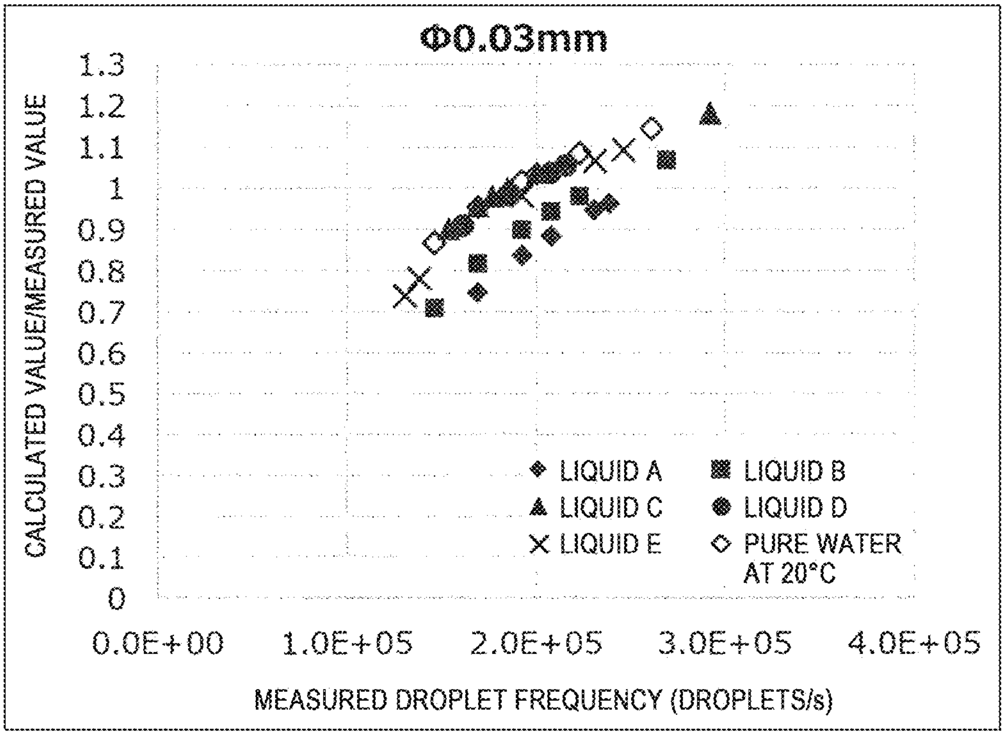
FIG. 12 is a diagram showing a relation between the measured droplet frequency and the calculated value/measured value for the liquid A to the liquid E and the pure water at 20° C. in Table 1 in the nozzle hole having a hole diameter of 0.03 mm.

FIG. 12 shows a relation between the measured droplet frequency (horizontal axis) and the calculated value/measured value (vertical axis) for the liquid A to the liquid E and the pure water at 20° C. in the spray nozzle 11 having the nozzle diameter b of 0.03 mm.

TABLE 6

| Nozzle diameter (mm) | Evaluated liquid | Measured droplet frequency (Droplets/s) | Calculated droplet frequency (Droplets/s) | Calculated value/ measured value |
|---|---|---|---|---|
| φ0.03 | A | 1.69E+05 | 1.26E+05 | 0.75 |
| | | 1.92E+05 | 1.61E+05 | 0.84 |
| | | 2.08E+05 | 1.84E+05 | 0.89 |
| | | 2.31E+05 | 2.18E+05 | 0.95 |
| | | 2.38E+05 | 2.30E+05 | 0.96 |
| | B | 1.46E+05 | 1.04E+05 | 0.71 |
| | | 1.69E+05 | 1.38E+05 | 0.82 |
| | | 1.92E+05 | 1.73E+05 | 0.90 |
| | | 2.08E+05 | 1.96E+05 | 0.94 |
| | | 2.23E+05 | 2.19E+05 | 0.98 |
| | | 2.69E+05 | 2.88E+05 | 1.07 |
| | C | 1.54E+05 | 1.39E+05 | 0.90 |
| | | 1.69E+05 | 1.62E+05 | 0.96 |
| | | 1.77E+05 | 1.73E+05 | 0.98 |
| | | 1.85E+05 | 1.85E+05 | 1.00 |
| | | 2.00E+05 | 2.08E+05 | 1.04 |
| | | 2.92E+05 | 3.46E+05 | 1.18 |
| | D | 1.62E+05 | 1.47E+05 | 0.91 |
| | | 1.85E+05 | 1.81E+05 | 0.98 |
| | | 2.08E+05 | 2.16E+05 | 1.04 |
| | | 2.15E+05 | 2.27E+05 | 1.06 |
| | | 2.46E+05 | 2.73E+05 | 1.11 |
| | E | 1.31E+05 | 9.66E+05 | 0.74 |
| | | 1.38E+05 | 1.08E+05 | 0.78 |
| | | 1.92E+05 | 1.89E+05 | 0.98 |
| | | 2.31E+05 | 2.46E+05 | 1.07 |
| | | 2.31E+05 | 2.46E+05 | 1.07 |
| | | 2.46E+05 | 2.69E+05 | 1.09 |
| | Pure water at 20° C. | 1.46E+05 | 1.27E+05 | 0.87 |
| | | 1.69E+05 | 1.61E+05 | 0.95 |
| | | 1.92E+05 | 1.96E+05 | 1.02 |
| | | 2.00E+05 | 2.07E+05 | 1.04 |
| | | 2.23E+05 | 2.42E+05 | 1.08 |
| | | 2.62E+05 | 2.99E+05 | 1.14 |

When the measured droplet frequency is in a range of $1.3\times10^5$ droplets/s to $7.1\times10^5$ droplets/s, the droplet frequencies of the evaluated liquids obtained based on the relational equation (1) all matched with an error within +/−30% (remarks: 90% or more of all the data matched with an error within +/−20%), indicating that the equation derived by regression analysis is appropriate.

As described above, in the liquid spray device 25, when the hole diameter b of the spray nozzle 11 is 0.015 mm to 0.03 mm, the liquid 3 having a viscosity in a range of 0.6 mPa·s to 4.0 mPa·s can be transitioned from a continuous flow to droplets, and be periodically and repeatedly sprayed in a droplet velocity range of 10 m/s to 80 m/s and in a droplet frequency range of $0.8\times10^5$ to $9.0\times10^5$.

Description of Effects of First Embodiment (1) According to the present embodiment, as can be understood from the above description, by using the liquid 3 having a viscosity in the above range for the nozzle hole 1 having the hole diameter b in a range of 0.015 mm to 0.030 mm, the droplets 7 of the above number of droplets (droplets/s) generated from the liquid 3 can fly at the above velocity and be sequentially applied to the object 9 such as skin. This makes it possible to effectively clean the object 9 such as skin.

Since physical stimulation can be applied to the skin by collision of the droplets 7 at a droplet frequency, that is, at the number of droplets (droplets/s), comparable to that of ultrasonic waves, improvement of skin conditions such as moisturizing and elasticity, that is, skin care can be expected.

(2) According to the present embodiment, since the droplet forming distance is set to 20 mm or less, it is possible to obtain an effect that the droplets 7 are easily applied to a target portion of the object 9 such as skin.

Second Embodiment

Hereinafter, a liquid spray device according to a second embodiment of the present disclosure will be described in detail.

The liquid spray device 25 of the present embodiment is a liquid spray device that performs processing such as effective cleaning not only on skin but also on fibers, metals, resins, and the like.

The liquid spray device 25 according to the present embodiment has substantially the same basic structure as that of the liquid spray device of the first embodiment, and has a different hole diameter b of the nozzle hole 1. Therefore, in the following description, the description of the same parts as those of the first embodiment will be omitted.

Table 7 shows a plurality of evaluated liquids and physical property values of viscosities thereof. Table 8 shows measured values of a droplet frequency and a droplet velocity obtained by evaluating a liquid F to a liquid I and pure water at 20° C. shown in Table 7 in the spray nozzle 11 having the hole diameter b of the nozzle hole 1 (hereinafter, also referred to as "nozzle diameter b") of 0.05 mm, 0.08 mm, and 0.12 mm. Table 9 shows measured values of a supply pressure (hereinafter, also referred to as "spray pressure") and a droplet forming distance for the liquid F to the liquid I and the pure water at 20° C. shown in Table 7 in the spray nozzle 11 having the nozzle diameter b of 0.05 mm, 0.08 mm, and 0.12 mm.

Tables 8 and 9 correspond to each other. That is, the droplet frequency and the droplet velocity in Table 8 are measured values corresponding to the respective supply pressures in Table 9.

The viscosities were measured using a viscoelasticity meter AR-G2 (manufactured by TA Instruments Japan Inc., temperature: 20° C.)

TABLE 7

| Evaluated liquid | Viscosity [mPa · s] |
|---|---|
| F | 2.50 |
| G | 0.97 |
| H | 1.47 |
| I | 1.20 |
| Pure water at 20° C. | 1.00 |
| Pure water at 40° C. | 0.65 |
| Z | 3.27 |

TABLE 8

| Evaluated liquid | Nozzle diameter: ϕ0.05 mm Measured droplet frequency (Droplets/s) | Nozzle diameter: ϕ0.05 mm Measured droplet velocity (m/s) | Nozzle diameter: ϕ0.08 mm Measured droplet frequency (Droplets/s) | Nozzle diameter: ϕ0.08 mm Measured droplet velocity (m/s) | Nozzle diameter: ϕ0.12 mm Measured droplet frequency (Droplets/s) | Nozzle diameter: ϕ0.12 mm Measured droplet velocity (m/s) |
|---|---|---|---|---|---|---|
| F | 4.99E+04 | 14.2 | 5.15E+04 | 22.4 | 6.65E+04 | 33.2 |
| | 6.89E+04 | 19.7 | 6.01E+04 | 26.1 | 6.99E+04 | 34.9 |
| | 8.07E+04 | 23.1 | 7.33E+04 | 31.9 | 8.48E+04 | 40.4 |
| | 8.90E+04 | 25.4 | 9.04E+04 | 37.7 | 9.12E+04 | 43.4 |
| | 1.28E+05 | 36.6 | 1.21E+05 | 44.8 | | |
| | 1.35E+05 | 38.7 | | | | |
| | 1.50E+05 | 42.7 | | | | |
| G | 1.57E+05 | 35.7 | 1.02E+05 | 31.9 | 6.95E+04 | 31.6 |
| | 1.79E+05 | 40.8 | 1.15E+05 | 36.0 | 8.37E+04 | 38.0 |
| | 2.03E+05 | 46.2 | 1.24E+05 | 38.7 | 9.49E+04 | 43.1 |
| | | | 1.29E+05 | 40.4 | 1.07E+05 | 48.6 |
| | | | 1.50E+05 | 46.9 | 1.10E+05 | 49.9 |
| | | | 1.63E+05 | 51.0 | | |
| H | 9.60E+04 | 23.4 | 5.20E+04 | 20.0 | 6.94E+04 | 30.2 |
| | 7.69E+04 | 21.4 | 8.04E+04 | 26.8 | 8.50E+04 | 37.0 |
| | 1.29E+05 | 36.0 | 9.99E+04 | 32.2 | 8.97E+04 | 39.0 |
| | 2.12E+05 | 48.2 | 1.19E+05 | 38.3 | 9.91E+04 | 43.1 |
| | 2.16E+05 | 49.2 | 1.36E+05 | 43.8 | 1.02E+05 | 44.4 |
| | | | 1.48E+05 | 47.8 | 1.15E+05 | 50.2 |
| I | 1.49E+05 | 34.0 | 1.15E+05 | 36.0 | 7.11E+04 | 30.9 |
| | 1.61E+05 | 36.7 | 1.24E+95 | 38.7 | 9.06E+04 | 39.4 |
| | 1.90E+05 | 43.1 | 1.30E+05 | 40.8 | 9.77E+04 | 42.5 |
| | 2.15E+05 | 48.9 | 1.47E+05 | 45.9 | 1.11E+05 | 48.2 |
| | | | 1.61E+05 | 50.3 | 1.17E+05 | 51.0 |
| Pure water at 20° C. | 1.37E+05 | 32.6 | 1.15E+05 | 36.0 | 6.94E+04 | 31.5 |
| | 1.47E+05 | 34.9 | 1.27E+05 | 39.7 | 8.73E+04 | 39.7 |
| | 1.81E+05 | 43.1 | 1.34E+05 | 41.7 | 9.25E+04 | 42.1 |
| | 2.29E+05 | 49.9 | 1.48E+05 | 46.1 | 1.02E+05 | 46.5 |
| | | | 1.63E+05 | 50.9 | 1.09E+05 | 49.5 |

TABLE 9

| Evaluated liquid | Nozzle diameter: ϕ0.05 mm Spray pressure (MPa) | Nozzle diameter: ϕ0.05 mm Droplet forming distance (mm) | Nozzle diameter: ϕ0.08 mm Spray pressure (MPa) | Nozzle diameter: ϕ0.08 mm Droplet forming distance (mm) | Nozzle diameter: ϕ0.12 mm Spray pressure (MPa) | Nozzle diameter: ϕ0.12 mm Droplet forming distance (mm) |
|---|---|---|---|---|---|---|
| F | 0.3 | 7.5 | 0.5 | 15.5 | 0.8 | 44.0 |
| | 0.5 | 8.5 | 0.7 | 21.0 | 0.9 | 65.0 |
| | 0.7 | 9.5 | 0.9 | 21.5 | 1.1 | 73.0 |
| | 0.9 | 10.0 | 1.1 | 21.5 | 1.3 | 80.0 |
| | 1.1 | 10.5 | 1.3 | 33.5 | | |
| | 1.3 | 11.5 | | | | |
| | 1.5 | 12.5 | | | | |
| G | 0.9 | 20.0 | 0.6 | 27.0 | 0.5 | 58.0 |
| | 1.1 | 24.0 | 0.7 | 30.0 | 0.8 | 72.5 |
| | 1.3 | 27.0 | 0.8 | 36.5 | 1.0 | 80.5 |
| | | | 0.9 | 42.5 | 1.2 | 88.5 |
| | | | 1.1 | 47.5 | 1.4 | 93.0 |
| | | | 1.4 | 51.5 | | |
| H | 0.3 | 14.0 | 0.3 | 30.5 | 0.5 | 65.5 |
| | 0.5 | 14.5 | 0.5 | 37.0 | 0.7 | 76.0 |
| | 1 | 25.0 | 0.7 | 35.5 | 0.9 | 83.0 |
| | 1.3 | 28.5 | 0.9 | 41.5 | 1 | 88.0 |
| | 1.4 | 30.0 | 1.1 | 53.5 | 1.1 | 89.5 |
| | | | 1.3 | 56.0 | 1.3 | 101.0 |
| I | 0.6 | 27.5 | 0.5 | 59.0 | 0.4 | 94.5 |
| | 0.7 | 31.5 | 0.6 | 62.5 | 0.6 | 111.5 |
| | 0.9 | 35.5 | 0.7 | 66.5 | 0.8 | 122.0 |
| | 1.1 | 37.0 | 0.9 | 71.5 | 1 | 133.5 |
| | | | 1.1 | 77.5 | 1.1 | 138.5 |

TABLE 9-continued

| Evaluated liquid | Nozzle diameter: ϕ0.05 mm Spray pressure (MPa) | Nozzle diameter: ϕ0.05 mm Droplet forming distance (mm) | Nozzle diameter: ϕ0.08 mm Spray pressure (MPa) | Nozzle diameter: ϕ0.08 mm Droplet forming distance (mm) | Nozzle diameter: ϕ0.12 mm Spray pressure (MPa) | Nozzle diameter: ϕ0.12 mm Droplet forming distance (mm) |
|---|---|---|---|---|---|---|
| Pure water at 20° C. | 0.7 | 19.0 | 0.7 | 32.0 | 0.5 | 54.0 |
| | 0.9 | 22.5 | 0.8 | 35.0 | 0.7 | 69.0 |
| | 1.1 | 25.0 | 0.9 | 39.0 | 0.9 | 76.5 |
| | 1.3 | 29.5 | 1.1 | 44.0 | 1.1 | 86.0 |
| | | | 1.3 | 49.0 | 1.3 | 88.0 |

The measured values of the droplet frequency and the droplet velocity of the liquid F to the liquid I and pure water at 20° C. in Table 8 were subjected to regression analysis, and a relational equation (2) with the droplet frequency $Drop_{freq}$ (droplets/s) was obtained using the nozzle diameter b (mm), the droplet velocity V (m/s), and the viscosity η (mPa·s) as parameters.

$$Drop_{freq}=9.0\times10^{4}-1.1\times10^{6}b+3.6\times10^{3}V-1.3\times10^{4}\eta \quad (2)$$

Figure 13:
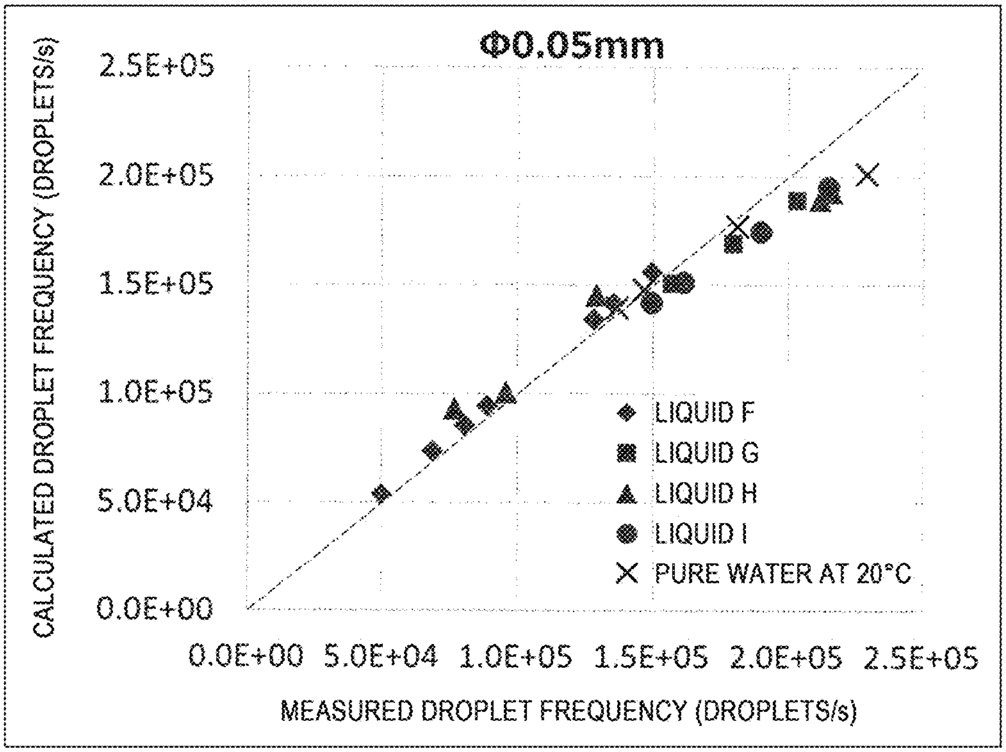
FIG. 13 is a diagram showing a relation between a measured value (measured droplet frequency) obtained by droplet frequency measurement and a calculated value (calculated droplet frequency) obtained by performing regression analysis on the measured value for a liquid F to a liquid I and pure water at 20° C. in Table 7 in a nozzle hole having a hole diameter of 0.05 mm.

FIG. 13 is a diagram showing a relation between a measured droplet frequency (horizontal axis) for the liquid F to the liquid I and pure water at 20° C. subjected to the regression analysis in the spray nozzle 11 having the nozzle diameter b of 0.05 mm and a calculated value calculated by the relational equation (2), that is, a calculated droplet frequency (vertical axis). The measured droplet frequency and the calculated droplet frequency showed a fairly good linear correlation.

Figure 14:
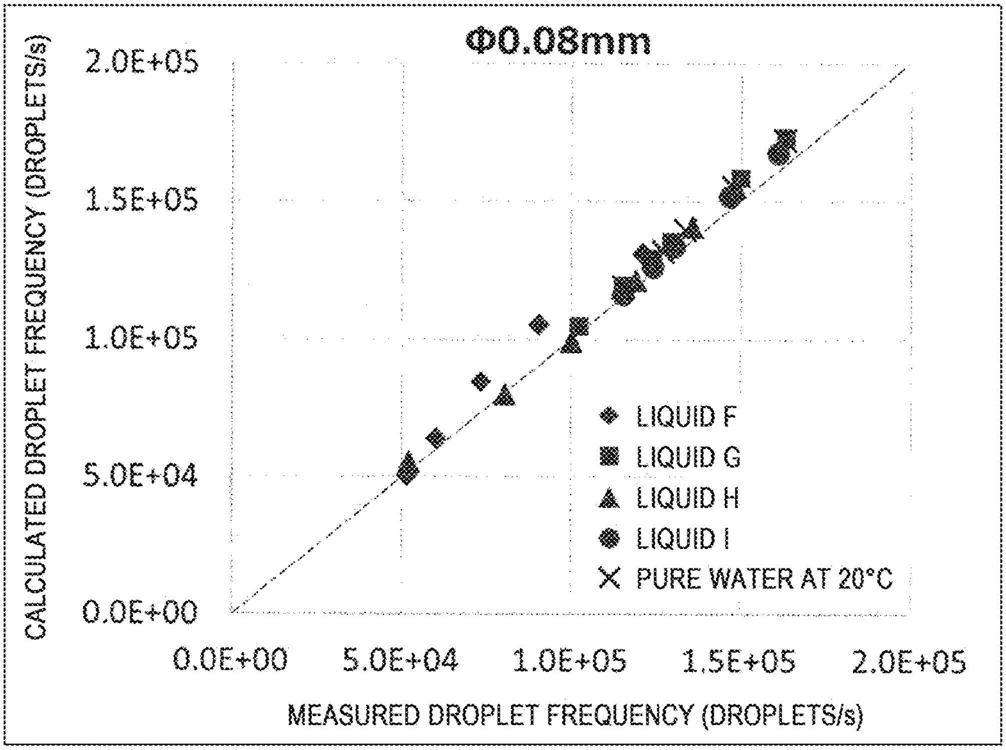
FIG. 14 is a diagram showing a relation between a measured value (measured droplet frequency) obtained by droplet frequency measurement and a calculated value (calculated droplet frequency) obtained by performing regression analysis on the measured value for the liquid F to the liquid I and the pure water at 20° C. in Table 7 in a nozzle hole having a hole diameter of 0.08 mm.

FIG. 14 is a diagram showing a relation between a measured droplet frequency (horizontal axis) for the liquid F to the liquid I and pure water at 20° C. subjected to the regression analysis in the spray nozzle 11 having the nozzle diameter b of 0.08 mm and a calculated value calculated by the relational equation (2), that is, a calculated droplet frequency (vertical axis). The measured droplet frequency and the calculated droplet frequency showed a fairly good linear correlation.

Figure 15:
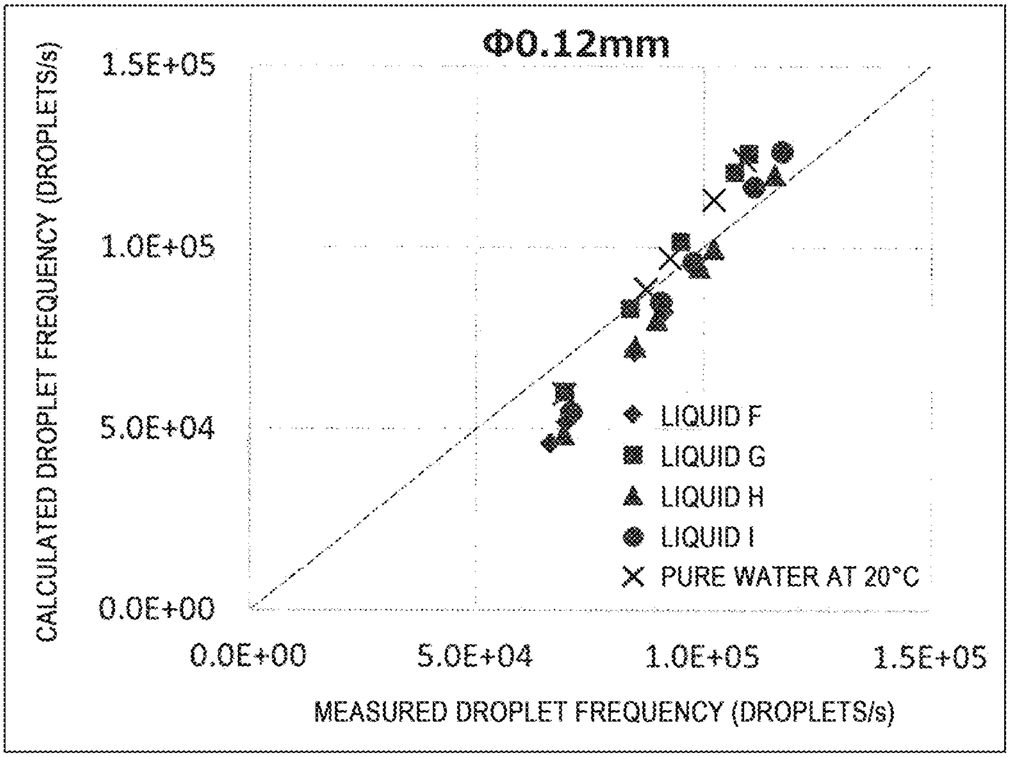
FIG. 15 is a diagram showing a relation between a measured value (measured droplet frequency) obtained by droplet frequency measurement and a calculated value (calculated droplet frequency) obtained by performing regression analysis on the measured value for the liquid F to the liquid I and the pure water at 20° C. in Table 7 in a nozzle hole having a hole diameter of 0.12 mm.

FIG. 15 is a diagram showing a relation between a measured droplet frequency (horizontal axis) for the liquid F to the liquid I and pure water at 20° C. subjected to the regression analysis in the spray nozzle 11 having a nozzle diameter b of 0.12 mm and a calculated value calculated by the relational equation (2), that is, a calculated droplet frequency (vertical axis). The measured droplet frequency and the calculated droplet frequency showed a fairly good linear correlation.

Next, the droplet frequency was calculated using the relational equation (2) for other liquids of pure water at 40° C. and a liquid Z, which are liquids having known physical properties and not applied to the regression analysis.

Figure 16:
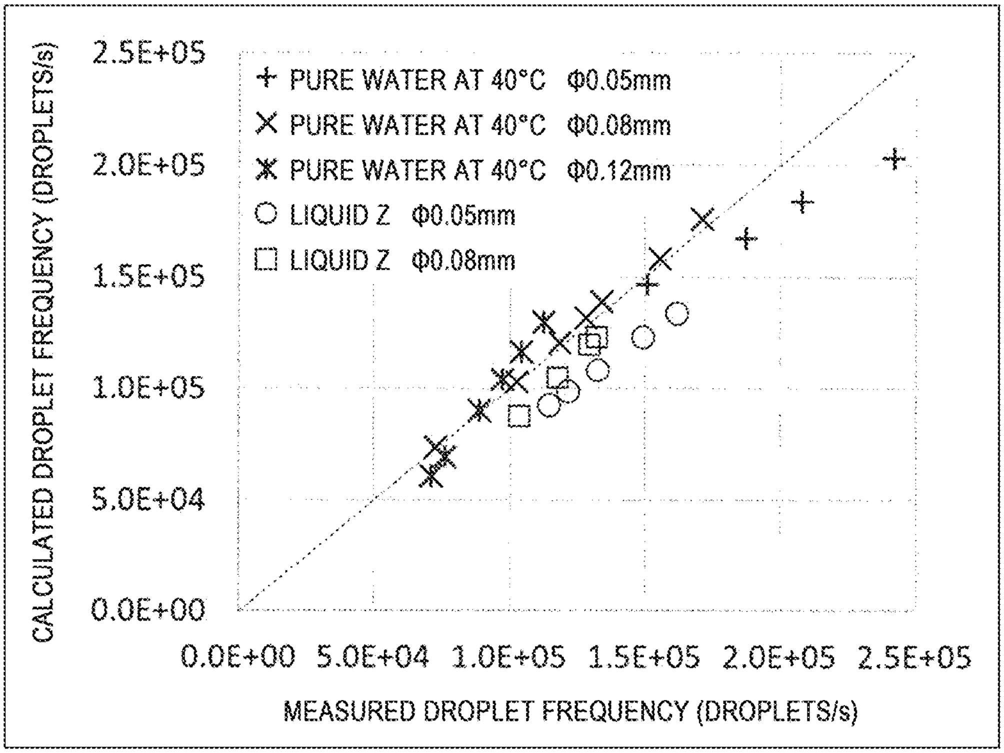
FIG. 16 is a diagram showing a relation between the measured droplet frequency and the calculated droplet frequency at each hole diameter as illustrated for pure water at 40° C. and a liquid Z in Table 7.

FIG. 16 is a diagram showing a relation between a measured droplet frequency (horizontal axis) and a calculated droplet frequency (vertical axis) at each nozzle diameter b as illustrated for the pure water at 40° C. and the liquid Z. The broken line in FIG. 16 is a line in which the measured droplet frequency completely matches the calculated droplet frequency. As can be seen from FIG. 16, the calculated droplet frequency was equal to or slightly lower than the measured droplet frequency, and good linear correlation was observed.

Table 10 shows the measured value of the droplet frequency, the calculated value of the droplet frequency, and a ratio between the measured value and the calculated value, that is, calculated value/measured value, for the liquid F to the liquid I, the pure water at 20° C., the pure water at 40° C., and the liquid Z in the spray nozzle 11 having the nozzle diameter b of 0.05 mm.

Figure 17:
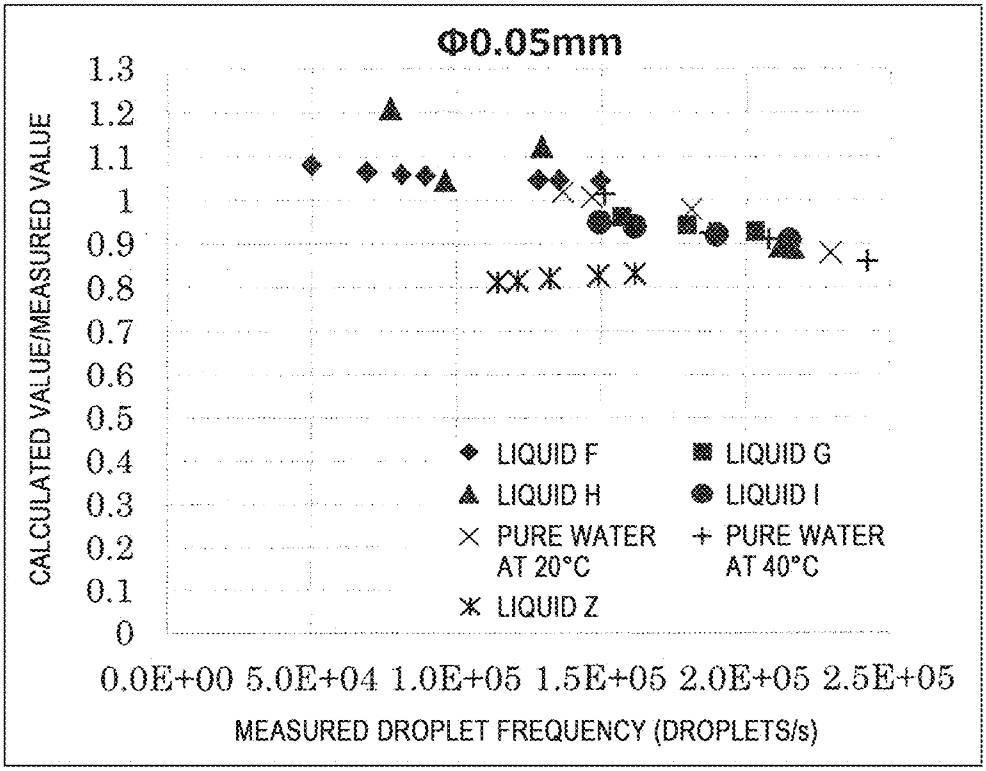
FIG. 17 is a diagram showing a relation between the measured droplet frequency and the calculated value/measured value for the liquid F to the liquid I, the pure water at 20° C., the pure water at 40° C., and the liquid Z in Table 7 in the nozzle hole having a hole diameter of 0.05 mm.

FIG. 17 shows a relation between the measured droplet frequency (horizontal axis) and the calculated value/measured value (vertical axis) for the liquid F to the liquid I, the pure water at 20° C., the pure water at 40° C., and the liquid Z in the spray nozzle 11 having the nozzle diameter b of 0.05 mm.

TABLE 10

| Nozzle diameter (mm) | Evaluated liquid | Measured droplet frequency (Droplets/s) | Calculated droplet frequency (Droplets/s) | Calculated value/ measured value |
|---|---|---|---|---|
| ϕ0.05 | F | 4.99E+04 | 5.39E+04 | 1.08 |
| | | 6.89E+04 | 7.34E+04 | 1.07 |
| | | 8.07E+04 | 8.56E+04 | 1.06 |
| | | 8.90E+04 | 9.41E+04 | 1.06 |
| | | 1.28E+05 | 1.34E+05 | 1.05 |
| | | 1.35E+05 | 1.42E+05 | 1.05 |
| | | 1.50E+05 | 1.56E+05 | 1.04 |
| | G | 1.57E+05 | 1.51E+05 | 0.96 |
| | | 1.79E+05 | 1.69E+05 | 0.94 |
| | | 2.03E+05 | 1.89E+05 | 0.93 |
| | H | 9.60E+04 | 1.00E+05 | 1.05 |
| | | 7.69E+04 | 9.30E+04 | 1.21 |
| | | 1.29E+05 | 1.45E+05 | 1.12 |
| | | 2.12E+05 | 1.89E+05 | 0.89 |
| | | 2.16E+05 | 1.93E+05 | 0.89 |
| | I | 1.49E+05 | 1.42E+05 | 0.95 |
| | | 1.61E+05 | 1.52E+05 | 0.94 |
| | | 1.90E+05 | 1.75E+05 | 0.92 |
| | | 2.15E+05 | 1.95E+05 | 0.91 |

TABLE 10-continued

| Nozzle diameter (mm) | Evaluated liquid | Measured droplet frequency (Droplets/s) | Calculated droplet frequency (Droplets/s) | Calculated value/ measured value |
|---|---|---|---|---|
| | Pure water at 20° C. | 1.37E+05 | 1.39E+05 | 1.02 |
| | | 1.47E+05 | 1.48E+05 | 1.01 |
| | | 1.81E+05 | 1.77E+05 | 0.98 |
| | | 2.29E+05 | 2.02E+05 | 0.88 |
| | Pure water at 40° C. | 1.51E+05 | 1.53E+05 | 1.01 |
| | | 1.87E+05 | 1.73E+05 | 0.92 |
| | | 2.08E+05 | 1.89E+05 | 0.91 |
| | | 2.42E+05 | 2.08E+05 | 0.86 |
| | Z | 1.14E+05 | 9.27E+04 | 0.81 |
| | | 1.21E+05 | 9.88E+04 | 0.82 |
| | | 1.32E+05 | 1.09E+05 | 0.82 |
| | | 1.49E+05 | 1.23E+05 | 0.83 |
| | | 1.62E+05 | 1.34E+05 | 0.83 |

Table 11 shows a measured value of the droplet frequency, a calculated value of the droplet frequency, and a ratio between the measured value and the calculated value, that is, calculated value/measured value, for the liquid F to the liquid I, the pure water at 20° C., the pure water at 40° C., and the liquid Z in the spray nozzle 11 having the nozzle diameter b of 0.08 mm.

Figure 18:
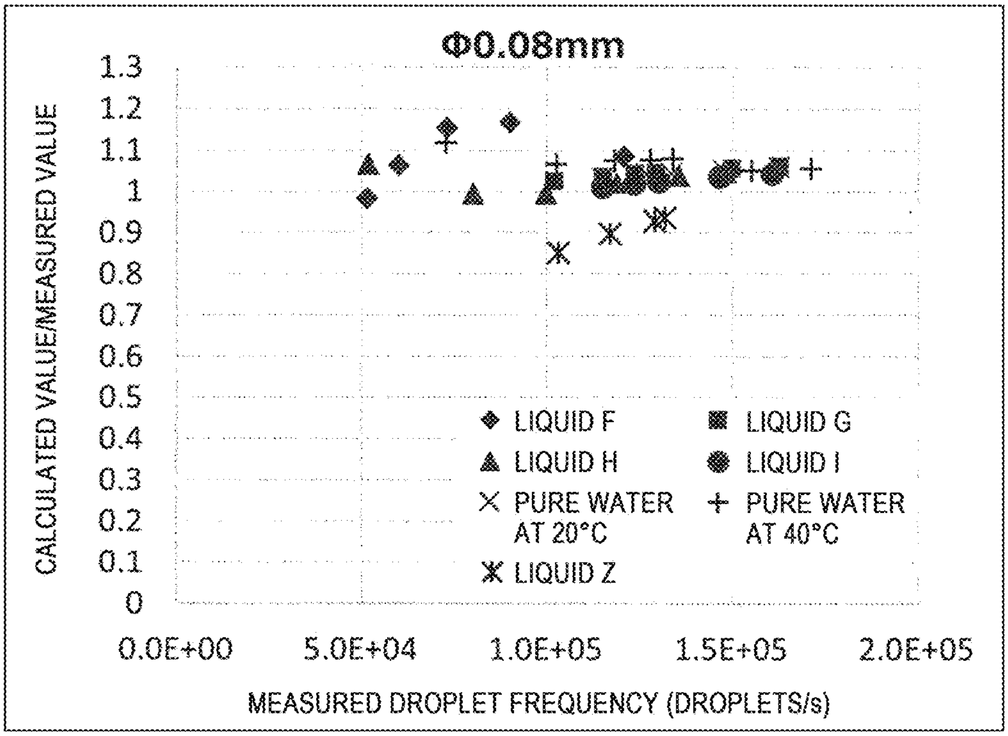
FIG. 18 is a diagram showing a relation between the measured droplet frequency and the calculated value/measured value for the liquid F to the liquid I, the pure water at 20° C., the pure water at 40° C., and the liquid Z in Table 7 in the nozzle hole having a hole diameter of 0.08 mm.

FIG. 18 shows a relation between the measured droplet frequency (horizontal axis) and the calculated value/measured value (vertical axis) for the liquid F to the liquid I, the pure water at 20° C., the pure water at 40° C., and the liquid Z in the spray nozzle 11 having a nozzle diameter b of 0.08 mm.

TABLE 11

| Nozzle diameter (mm) | Evaluated liquid | Measured droplet frequency (Droplets/s) | Calculated droplet frequency (Droplets/s) | Calculated value/ measured value |
|---|---|---|---|---|
| ϕ0.08 | F | 5.15E+04 | 5.05E+04 | 0.98 |
| | | 6.01E+04 | 6.40E+04 | 1.06 |
| | | 7.33E+04 | 8.47E+04 | 1.15 |
| | | 9.04E+04 | 1.05E+05 | 1.17 |
| | | 1.21E+05 | 1.31E+05 | 1.08 |
| | G | 1.02E+05 | 1.05E+05 | 1.03 |
| | | 1.15E+05 | 1.19E+05 | 1.04 |
| | | 1.24E+05 | 1.29E+05 | 1.04 |
| | | 1.29E+05 | 1.35E+05 | 1.05 |
| | | 1.50E+05 | 1.59E+05 | 1.06 |
| | | 1.63E+05 | 1.73E+05 | 1.06 |
| | H | 5.20E+04 | 5.55E+04 | 1.07 |
| | | 8.04E+04 | 7.99E+04 | 0.99 |
| | | 9.99E+04 | 9.94E+04 | 1.00 |
| | | 1.19E+05 | 1.21E+05 | 1.02 |
| | | 1.36E+05 | 1.41E+05 | 1.04 |
| | | 1.48E+05 | 1.55E+05 | 1.05 |
| | I | 1.15E+05 | 1.16E+05 | 1.01 |
| | | 1.24E+05 | 1.26E+05 | 1.02 |
| | | 1.30E+05 | 1.34E+05 | 1.02 |
| | | 1.47E+05 | 1.52E+05 | 1.03 |
| | | 1.61E+05 | 1.68E+05 | 1.04 |
| | Pure water at 20° C. | 1.15E+05 | 1.19E+05 | 1.03 |
| | | 1.27E+05 | 1.32E+05 | 1.04 |
| | | 1.34E+05 | 1.40E+05 | 1.05 |
| | | 1.48E+05 | 1.55E+05 | 1.05 |
| | | 1.63E+05 | 1.73E+05 | 1.06 |
| | Pure water at 40° C. | 7.29E+04 | 8.15E+04 | 1.12 |
| | | 1.03E+05 | 1.10E+05 | 1.07 |
| | | 1.18E+05 | 1.27E+05 | 1.07 |
| | | 1.28E+05 | 1.38E+05 | 1.08 |
| | | 1.34E+05 | 1.45E+05 | 1.08 |
| | | 1.55E+05 | 1.63E+05 | 1.05 |
| | | 1.71E+05 | 1.81E+05 | 1.06 |

TABLE 11-continued

| Nozzle diameter (mm) | Evaluated liquid | Measured droplet frequency (Droplets/s) | Calculated droplet frequency (Droplets/s) | Calculated value/ measured value |
|---|---|---|---|---|
| | Z | 1.03E+05 | 8.81E+04 | 0.85 |
| | | 1.17E+05 | 1.05E+05 | 0.90 |
| | | 1.29E+05 | 1.20E+05 | 0.93 |
| | | 1.32E+05 | 1.24E+05 | 0.94 |

Table 12 shows a measured value of the droplet frequency, a calculated value of the droplet frequency, and a ratio between the measured value and the calculated value, that is, calculated value/measured value, for the liquid F to the liquid I, the pure water at 20° C., and the pure water at 40° C. in the spray nozzle 11 having the nozzle diameter b of 0.12 mm.

Figure 19:
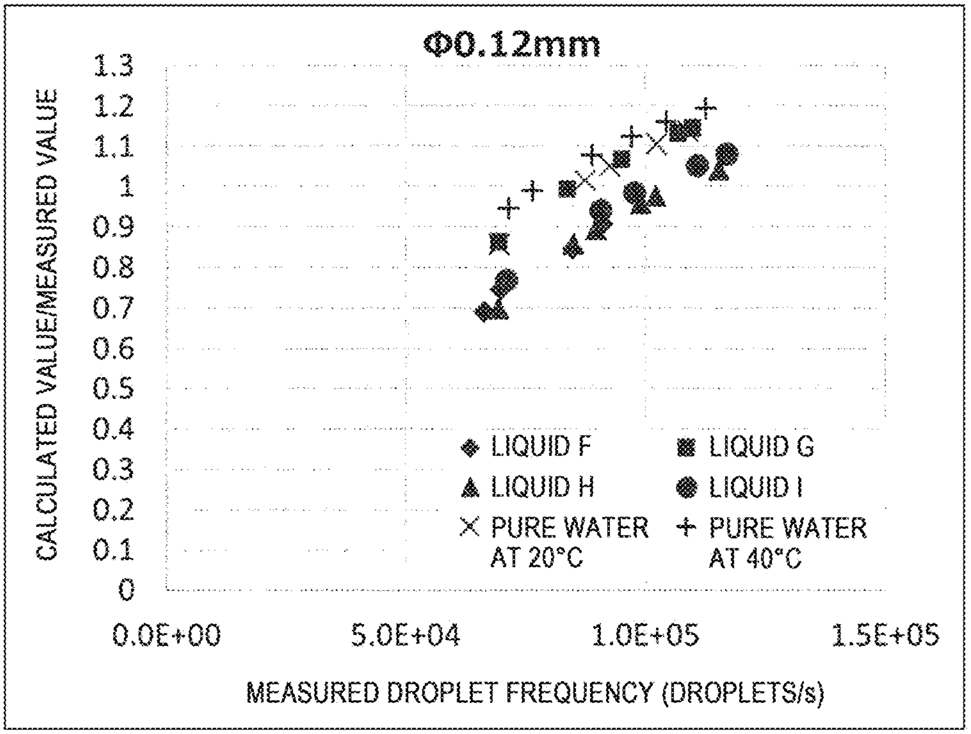
FIG. 19 is a diagram showing a relation between the measured droplet frequency and the calculated value/measured value for the liquid F to the liquid I, the pure water at 20° C., and the pure water at 40° C. in Table 7 in the nozzle hole having a hole diameter of 0.12 mm.

FIG. 19 shows a relation between the measured droplet frequency (horizontal axis) and the calculated value/measured value (vertical axis) for the liquid F to the liquid I, the pure water at 20° C., and the pure water at 40° C. in the spray nozzle 11 having the nozzle diameter b of 0.12 mm.

TABLE 12

| Nozzle diameter (mm) | Evaluated liquid | Measured droplet frequency (Droplets/s) | Calculated droplet frequency (Droplets/s) | Calculated value/ measured value |
|---|---|---|---|---|
| φ0.12 | F | 6.65E+04 | 4.60E+04 | 0.69 |
| | | 6.99E+04 | 5.21E+04 | 0.75 |
| | | 8.48E+04 | 7.16E+04 | 0.85 |
| | | 9.12E+04 | 8.26E+04 | 0.91 |
| | G | 6.95E+04 | 6.01E+04 | 0.86 |
| | | 8.37E+04 | 8.33E+04 | 0.99 |
| | | 9.49E+04 | 1.02E+05 | 1.07 |
| | | 1.07E+05 | 1.21E+05 | 1.13 |
| | | 1.10E+05 | 1.26E+05 | 1.15 |
| | H | 6.94E+04 | 4.86E+04 | 0.70 |
| | | 8.50E+04 | 7.30E+04 | 0.86 |
| | | 8.97E+04 | 8.03E+04 | 0.89 |
| | | 9.91E+04 | 9.49E+04 | 0.96 |
| | | 1.02E+05 | 9.98E+04 | 0.98 |
| | | 1.15E+05 | 1.21E+05 | 1.04 |
| | I | 7.11E+04 | 5.46E+04 | 0.77 |
| | | 9.06E+04 | 8.52E+04 | 0.94 |
| | | 9.77E+04 | 9.61E+04 | 0.98 |
| | | 1.11E+05 | 1.17E+05 | 1.05 |
| | | 1.17E+05 | 1.27E+05 | 1.08 |
| | Pure water at 20° C. | 6.94E+04 | 5.95E+04 | 0.86 |
| | | 8.73E+04 | 8.88E+04 | 1.02 |
| | | 9.25E+04 | 9.73E+04 | 1.05 |
| | | 1.02E+05 | 1.13E+05 | 1.11 |
| | | 1.09E+05 | 1.24E+05 | 1.14 |
| | Pure water at 40° C. | 7.15E+04 | 6.76E+04 | 0.94 |
| | | 7.65E+04 | 7.56E+04 | 0.99 |
| | | 8.88E+04 | 9.58E+04 | 1.08 |
| | | 9.70E+04 | 1.09E+05 | 1.13 |
| | | 1.04E+05 | 1.21E+05 | 1.16 |
| | | 1.13E+05 | 1.35E+05 | 1.20 |

When the measured droplet frequency is in a range of $0.5\times10^5$ droplets/s to $2.4\times10^5$ droplets/s, the droplet frequencies of the evaluated liquids obtained based on the relational equation (2) all matched with an error within +/−30% (remarks: 95% or more of all the data matched with an error within +/−20%), indicating that the equation derived by regression analysis is appropriate.

As described above, in the liquid spray device 25, when the hole diameter b of the spray nozzle 11 is 0.05 mm to 0.12 mm, the liquid 3 having a viscosity in a range of 0.6 mPa·s to 4.0 mPa·s can be transitioned from a continuous flow to droplets, and the liquid 3 can be periodically and repeatedly sprayed in a droplet velocity range of 10 m/s to 70 m/s and in a droplet frequency range of $0.3\times10^5$ to $4.0\times10^5$.

Description of Effects of Second Embodiment (1) According to the present embodiment, as can be understood from the above description, by using the liquid 3 having a viscosity in the above range for the nozzle hole 1 having a hole diameter in a range of 0.05 mm to 0.12 mm, the droplets 7 of the above number of droplets (droplets/s) generated from the liquid 3 can fly at the above velocity and be sequentially applied to the object 9 such as skin, a fiber, or a metal. This makes it possible to perform processing such as effective cleaning on the object 9.

(2) According to the present embodiment, since the droplet forming distance is set to 5 mm to 150 mm, the nozzle hole 1 of the spray nozzle 11 can be used close to the object 9, or the nozzle hole 1 can be used while maintaining a sufficient distance at which the nozzle hole 1 does not come into contact with the object 9. Accordingly, an appropriate impact pressure can be applied to the object 9 by controlling the droplet velocity according to the characteristics of the object 9.

By applying the droplets 7 of the present embodiment to fibers, metals, resins, or the like, it is possible to clean only dirt adhering to a surface or inside of the object 9 without damaging a base material of the object 9. It is possible to obtain an effect that the droplets 7 are easily applied to a target portion of the object 9.

OTHER EMBODIMENTS

The liquid spray device 25 according to the embodiments of the present disclosure is basically configured as described above. Needless to say, the liquid spray device 25 may be modified or omitted in a part of the configuration without departing from the gist of the present disclosure.

In the description of the above embodiments, the spray nozzle 11 includes one nozzle hole 1, but when a plurality of nozzle holes 1 are provided, a cleaning area can be easily expanded. In this case, the number of the nozzle holes 1 is preferably determined based on the hole diameter b of the nozzle hole 1, an appropriate flow rate in use, and a desired supply pressure.

By providing the nozzle holes 1 having different hole diameters of the nozzle hole 1, it is possible to spray the droplets 7 having different droplet diameters at the same droplet velocity. Although the droplet diameter does not affect the impact pressure, the kinetic energy increases as the number of droplets increases, and thus a force that presses a collided portion increases. As a result, a massage effect can be improved while maintaining the detergency.

What is claimed is:

1. A liquid spray device comprising:

a liquid having a viscosity η of 0.6 mPa·s to 4.0 mPa·s;

a spray nozzle having at least one nozzle hole configured to spray the liquid;

a pressurized liquid supply unit configured to pressurize the liquid and feed the pressurized liquid to the spray nozzle; and a controller configured to control an operation of the pressurized liquid supply unit such that when the liquid is sprayed from the nozzle hole, the liquid flies in a state of splitting into droplets from a continuous flow, wherein the nozzle hole has a hole diameter b of 0.015 mm to 0.030 mm, and the controller controls a supply pressure of the pressurized liquid supply unit such that a velocity V of the liquid sprayed from the nozzle hole is 10 m/s to 80 m/s, and that the number of droplets (droplets/s), which is the number of the droplets generated by the continuous flow splitting into the droplets per second, is greater than or equal to $0.7\times Drop_{freq}$ and less than or equal to $1.3\times Drop_{freq}$ where $Drop_{freq}$ is calculated from the following equation (1):

$$Drop_{freq}=2.0\times10^5-9.2\times10^6 b+1.0\times10^4 V-1.5\times10^4\eta \quad (1).$$

2. The liquid spray device according to claim 1, wherein the liquid has a viscosity of 0.65 mPa·s to 3.3 mPa·s, and the velocity of the liquid to be sprayed from the nozzle hole is in a range of 19 m/s to 63 m/s, and the number of droplets (droplets/s) is in a range of $1.3\times10^5$ to $7.1\times10^5$.

3. The liquid spray device according to claim 2, wherein a droplet forming distance at which the continuous flow splits into droplets is 20 mm or less.

4. The liquid spray device according to claim 1, wherein a droplet forming distance at which the continuous flow splits into droplets is 20 mm or less.

5. A liquid spray device comprising:

a liquid having a viscosity η of 0.6 mPa·s to 4.0 mPa·s;

a spray nozzle having at least one nozzle hole configured to spray the liquid;

a pressurized liquid supply unit configured to pressurize the liquid and feed the pressurized liquid to the spray nozzle; and a controller configured to control an operation of the pressurized liquid supply unit such when that the liquid is sprayed from the nozzle hole, the liquid flies in a state of splitting into droplets from a continuous flow, wherein the nozzle hole has a hole diameter b of 0.05 mm to 0.12 mm, and the controller controls a supply pressure of the pressurized liquid supply unit such that a velocity V of the liquid to be sprayed from the nozzle hole is 10 m/s to 70 m/s, and that the number of droplets (droplets/s) $Drop_{freq}$, which is the number of the droplets generated by the continuous flow splitting into the droplets per second, is greater than or equal to $0.7\times Drop_{freq}$ and less than or equal to $1.3\times Drop_{freq}$ where $Drop_{freq}$ is calculated from the following equation (2):

$$Drop_{freq}=9.0\times10^4-1.1\times10^6 b+3.6\times10^3 V-1.3\times10^4\eta \quad (2).$$

6. The liquid spray device according to claim 5, wherein the liquid has a viscosity of 0.65 mPa·s to 3.3 mPa·s, and the velocity of the liquid to be sprayed from the nozzle hole is in a range of 14 m/s to 52 m/s, and the number of droplets (droplets/s) is in a range of $0.5\times10^5$ to $2.4\times10^5$.

7. The liquid spray device according to claim 6, wherein a droplet forming distance at which the continuous flow splits into droplets is 5 mm to 150 mm.

8. The liquid spray device according to claim 5, wherein a droplet forming distance at which the continuous flow splits into droplets is 5 mm to 150 mm.

* * * * *